US012757155B2

(12) United States Patent
Yoshioka et al.

(10) Patent No.: US 12,757,155 B2
(45) Date of Patent: Oct. 6, 2026

(54) BASE STATION AND COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP); Luhua You, Beijing (CN); Weiqi Sun, Beijing (CN); Jing Wang, Beijing (CN); Lan Chen, Beijing (CN); Jinming Zhao, Beijing (CN); Yong Li, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 227 days.

(21) Appl. No.: 18/837,760

(22) PCT Filed: Feb. 21, 2022

(86) PCT No.: PCT/JP2022/007055

§ 371 (c)(1),
(2) Date: Aug. 12, 2024

(87) PCT Pub. No.: WO2023/157318

PCT Pub. Date: Aug. 24, 2023

(65) Prior Publication Data

US 2025/0203556 A1 Jun. 19, 2025

(51) Int. Cl.
*H04W 64/00* (2009.01)
*H04L 5/00* (2006.01)
*H04W 84/06* (2009.01)

(52) U.S. Cl.
CPC ........... *H04W 64/00* (2013.01); *H04L 5/0051* (2013.01); *H04W 84/06* (2013.01)

(58) Field of Classification Search
CPC ..... H04W 64/00; H04W 4/029; H04W 24/08; H04W 24/10; H04W 64/003; H04W 56/0045
See application file for complete search history.

(56) References Cited

U.S. PATENT DOCUMENTS

2021/0109188 A1* 4/2021 Kumar .................. G01S 5/0205
2023/0269048 A1* 8/2023 Kumar .................. H04L 5/0051 370/329
2023/0309042 A1* 9/2023 Da ...................... H04W 56/005
(Continued)

FOREIGN PATENT DOCUMENTS

CA 3138375 A1 * 11/2020 ............ H04W 64/00
WO WO-2021094183 A1 * 5/2021 ............ H04W 4/029

OTHER PUBLICATIONS

ETSI TS 138 305 V16.1.0 (Jul. 2020) (Year: 2020).*
(Continued)

*Primary Examiner* — Dung Hong
(74) *Attorney, Agent, or Firm* — Osha Bergman Watanabe & Burton LLP

(57) ABSTRACT

A base station in a network system is provided. The base station includes a reception unit configured to receive a first reference signal from a terminal via a first non-terrestrial communication device; and a transmission unit configured to transmit, to a location management function (LMF), information related to a propagation delay of the first reference signal and information related to a reception timing of the first reference signal.

4 Claims, 21 Drawing Sheets

(56) References Cited

U.S. PATENT DOCUMENTS

2025/0081142 A1* 3/2025 Hasegawa ............... G01S 19/34

OTHER PUBLICATIONS

3GPP TS 38.300 V16.8.0; "3rd Generation Partnership Project; Technical Specification Group Radio Access Network; NR; NR and NG-RAN Overall Description; Stage 2 (Release 16)"; Dec. 2021 (152 pages).
3GPP TR 38.821 V16.0.0; "3rd Generation Partnership Project; Technical Specification Group Radio Access Network; Solutions for NR to support non-terrestrial networks (NTN) (Release 16)"; Dec. 2019 (140 pages).
Konishi et al., "A Study on Downlink Frequency Sharing in HAPS Mobile Communication System", General Conference of Institute of Electronics, Information and 10 Communication Engineers, B-17-1; 2020 (3 pages).
3GPP TS 38.305 V16.7.0; "3rd Generation Partnership Project; Technical Specification Group Radio Access Network; NG Radio Access Network (NG-RAN); Stage 2 functional specification of User Equipment (UE) positioning in NG-RAN (Release 16)"; Dec. 2021 (121 pages).
3GPP TS 38.455 V16.6.0; "3rd Generation Partnership Project; Technical Specification Group Radio Access Network; NG-RAN; NR Positioning Protocol A (NRPPa) (Release 16)"; Dec. 2021 (154 pages).
3GPP TS 37.355 V16.7.0; "3rd Generation Partnership Project; Technical Specification Group Radio Access Network; LTE Positioning Protocol (LPP) (Release 16)"; Dec. 2021 (299 pages).
3GPP TS 23.032 V16.1.0; "3rd Generation Partnership Project; Technical Specification Group Services and System Aspects; Universal Geographical Area Description (GAD) (Release 16)"; Dec. 2021 (36 pages).
3GPP TS 38.215 V16.4.0; "3rd Generation Partnership Project; Technical Specification Group Radio Access Network; NR; Physical layer measurements (Release 16)"; Dec. 2020 (25 pages).
International Search Report issued in corresponding International Application No. PCT/JP2022/007055, mailed on Oct. 4, 2022 (5 pages).
Written Opinion issued in corresponding International Application No. PCT/JP2022/007055, mailed on Oct. 4, 2022 (3 pages).

* cited by examiner

BASE STATION AND COMMUNICATION METHOD

FIELD OF THE INVENTION

The present invention relates to a base station and a communication method in a wireless communication system.

BACKGROUND OF THE INVENTION

New radio (NR) (also referred to as "5G") which is a successor system of long term evolution (LTE) is known. In the field of wireless communications (hereinafter, referred to as "IEEE"), a technology that satisfies requirements such as a large-capacity system, a high-speed data transmission rate, low delay, simultaneous connection of a large number of terminals, low cost, and power saving has been studied (for example, Non-Patent Document 1).

Further, currently, a non-terrestrial network (NTN) is being studied. The NTN provides a service to an area which cannot be covered by a terrestrial 5G network mainly in terms of cost, by using a non-terrestrial network such as a satellite (for example, Non-Patent Document 2 and Non-Patent Document 3).

CITATION LIST

Non-Patent Documents

[Non-Patent Document 1]3GPP TS 38.300 V16.8.0 (2021-12)

[Non-Patent Document 2]3GPP TR 38.821 V16.0.0 (2019-12)

[Non-Patent Document 3] Konishi et al., "A study on downlink frequency sharing in HAPS mobile communication system", General Conference of Institute of Electronics, Information and Communication Engineers, B-17-1,2020

[Non-Patent Document 4]3GPP TS 38.305 V16.7.0 (2021-12)

[Non-Patent Document 5]3GPP TS 38.455 V16.6.0 (2021-12)

[Non-Patent Document 6]3GPP TS 37.355 V16.7.0 (2021-12)

[Non-Patent Document 7]3GPP TS 23.032 V16.1.0 (2021-12)

[Non-Patent Document 8]3GPP TS 38.215 V16.4.0 (2020-12)

SUMMARY OF THE INVENTION

Technical Problem

For example, in order to comply with regulations of each country related to lawful interception, emergency calls, PWS (Public Warning System), etc., the location information of the terminal needs to be verified on the network side. In a next-generation system (for example, a non-terrestrial network (NTN)), since a distance between a base station in the sky and a terminal is very large and a communication path is configured by a feeder link and a service link, the network cannot sufficiently verify location information of the terminal by an existing method.

The present invention has been made in view of the above factors, and an object of the present invention is to perform positioning of a terminal in a network system.

Solution to Problem

According to a disclosed technology, a base station in a network system is provided. The base station includes

- a reception unit configured to receive a first reference signal from a terminal via a first non-terrestrial communication device; and
- a transmission unit configured to transmit, to a location management function (LMF), information related to a propagation delay of the first reference signal and information related to a reception timing of the first reference signal.

Advantageous Effects of Invention

According to the disclosed technology, it is possible to perform positioning of a terminal in a network system.

DETAILED DESCRIPTION OF THE PREFERRED EMBODIMENTS

Hereinafter, embodiments of the present invention will be described with reference to the accompanying drawings. The embodiments described below are each an example, and the embodiments to which the present invention is applied is not limited to the following embodiments.

In the operation of the wireless communication system according to the embodiments of the present invention, existing technologies are used as appropriate. The existing technologies are, for example, existing LTE, but are not limited to existing LTE. In addition, the term "LTE" used in the present specification has a broad meaning including LTE-Advanced and schemes (example: NR) subsequent to LTE-Advanced unless otherwise specified.

In addition, in the embodiments of the present invention described below, terms such as a synchronization signal (SS), a primary SS (PSS), a secondary SS (SSS), a physical broadcast channel (PBCH), a physical random access channel (PRACH), a physical downlink control channel (PDCCH), a physical downlink shared channel (PDSCH), a physical uplink control channel (PUCCH), and a physical uplink shared channel (PUSCH) used in the existing LTE are used. This is for convenience of description, and signals, functions, and the like similar to these may be referred to by other names. The above-mentioned terms in NR correspond to NR-SS, NR-PSS, NR-SSS, NR-PBCH, NR-PRACH, NR-PDCCH, NR-PDSCH, NR-PUCCH, NR-PUSCH and the like. However, even a signal used for NR is not necessarily specified as "NR-".

In the embodiments of the present invention, the duplex scheme may be a time division duplex (TDD) scheme, a frequency division duplex (FDD) scheme, or another scheme (for example, flexible duplex).

In the embodiments of the present invention, "configuring" a radio parameter or the like may mean that a predetermined value is pre-configured or that a radio parameter notified from the base station 10 or the terminal 20 is configured.

Figure 1:
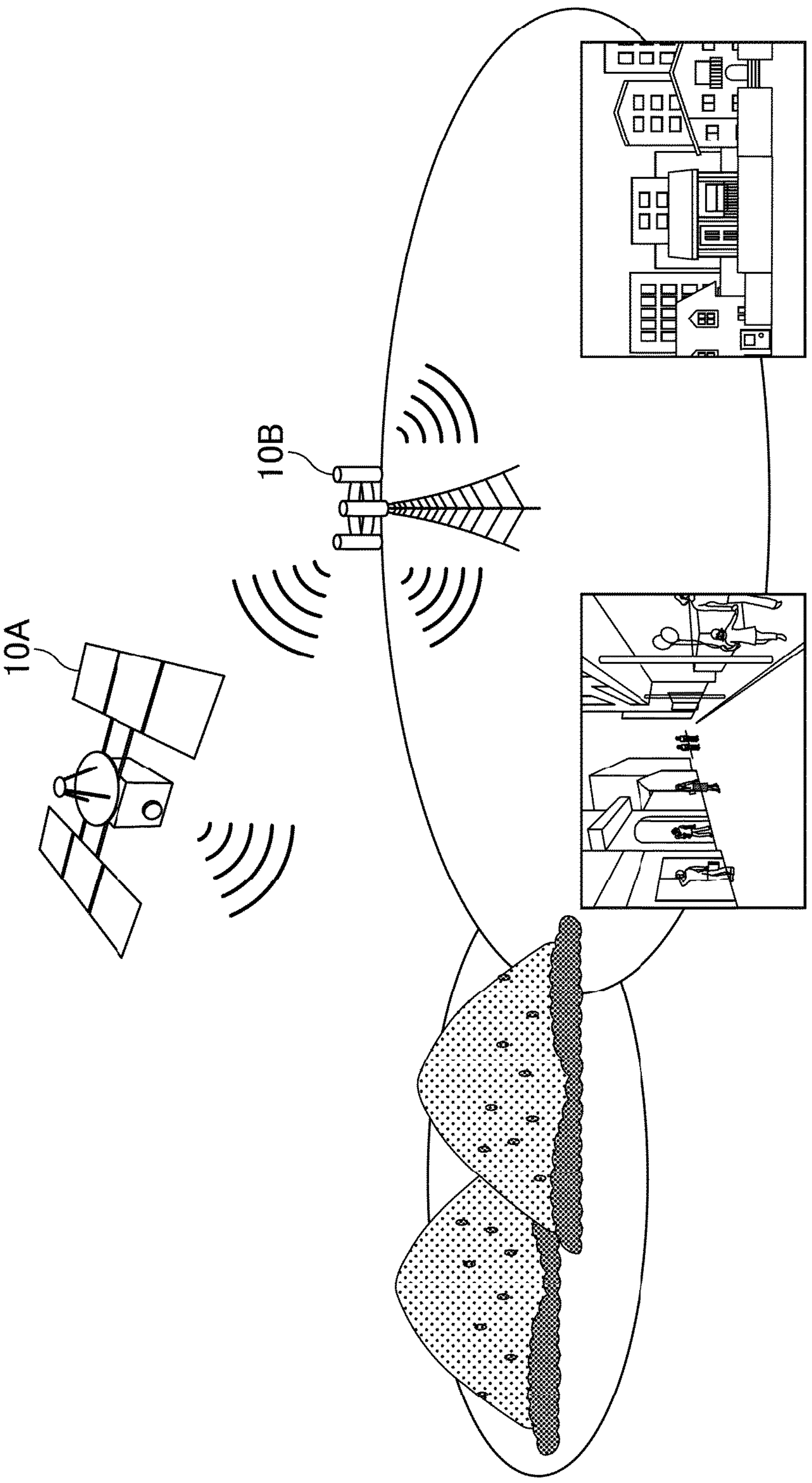
FIG. 1 is a diagram illustrating an example (1) of an NTN.

FIG. 1 is a diagram illustrating an example (1) of the NTN. The NTN (Non-Terrestrial Network) provides a service to an area which cannot be covered by a terrestrial 5G network mainly in terms of cost by using a device existing non-terrestrially such as a satellite. Further, the NTN can provide a more reliable service. For example, the present invention is assumed to be applied to IoT (Inter of Things), ships, buses, trains, and critical communications. Also, NTN has scalability by efficient multicast or broadcast.

As an example of NTN, as illustrated in FIG. 1, a satellite 10A can retransmit signals transmitted from a terrestrial base station 10B to provide service in areas where no terrestrial base stations are located, such as in mountainous regions.

The terrestrial 5G network may have a configuration as described below. The terrestrial 5G network includes one or more base stations 10 and one or more terminals 20. The base station 10 is a communication device that provides one or more cells and performs wireless communication with the terminals 20. The physical resource of the radio signal is defined in a time domain and a frequency domain, and the time domain may be defined by the number of OFDM symbols, and the frequency domain may be defined by the number of subcarriers or the number of resource blocks. The base station 10 transmits a synchronization signal and system information to the terminal 20. The synchronization signal is, for example, the NR-PSS and the NR-SSS. The system information is transmitted by, for example, the NR-PBCH and is also referred to as broadcast information.

The base station 10 transmits a control signal or data to the terminal 20 in a downlink (DL), and receives a control signal or data from the terminal 20 in an uplink (UL). Both the base station 10 and the terminal 20 can transmit and receive signals by performing beamforming. In addition, both the base station 10 and the terminal 20 can apply communication by multiple input multiple output (MIMO) to DL or UL. In addition, both the base station 10 and the terminal 20 may perform communication via a secondary cell (SCell) and a primary cell (PCell) by carrier aggregation (CA).

The terminals 20 are communication devices having a wireless communication function, such as smartphones, mobile phones, tablets, wearable terminals, and machine-to-machine (M2M) communication modules. The terminals 20 receive a control signal or data from the base station 10 in the DL and transmit a control signal or data to the base station 10 in the UL, thereby using various communication services provided by the radio communication system.

Figure 2:
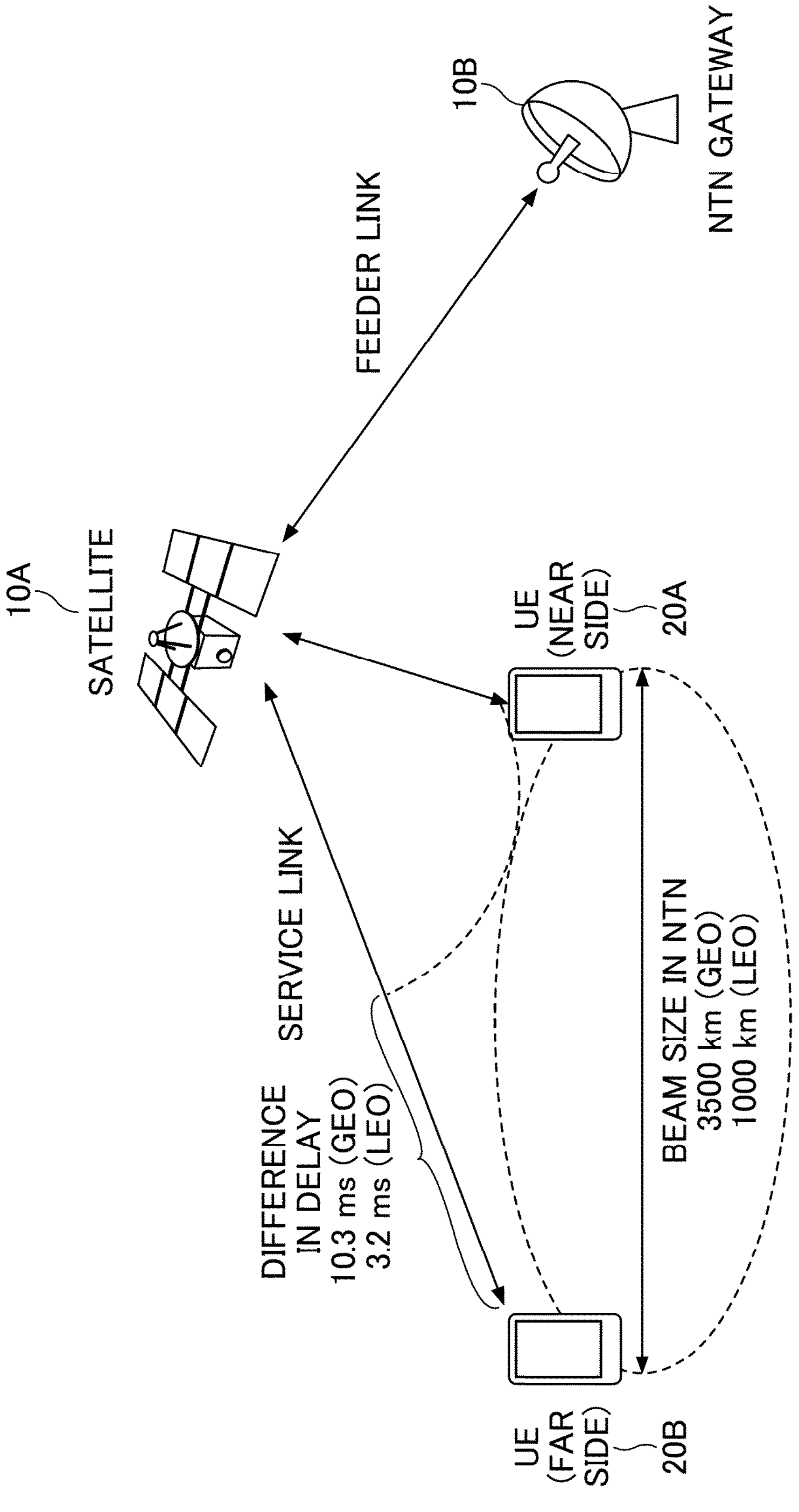
FIG. 2 is a diagram illustrating an example (2) of NTN.

FIG. 2 is a diagram illustrating an example (2) of the NTN. An area per cell or beam in the NTN is very large compared with a terrestrial network (Terrestrial Network, TN). FIG. 2 illustrates an example of the NTN formed by satellite retransmission. The connection between the satellite 10A and an NTN gateway 10B is called a feeder link, and the connection between the satellite 10A and a UE 20 is called a service link.

As illustrated in FIG. 2, the difference in delay between a near side UE 20A and a far side UE 20B is, for example, 10.3 ms for GEO-Geosynchronous Orbit and 3.2 ms for LEO-Low Earth Orbit. The beam size in the NTN is, for example, 3500 km in the case of GEO, and 1000 km in the case of LEO.

Figure 3:
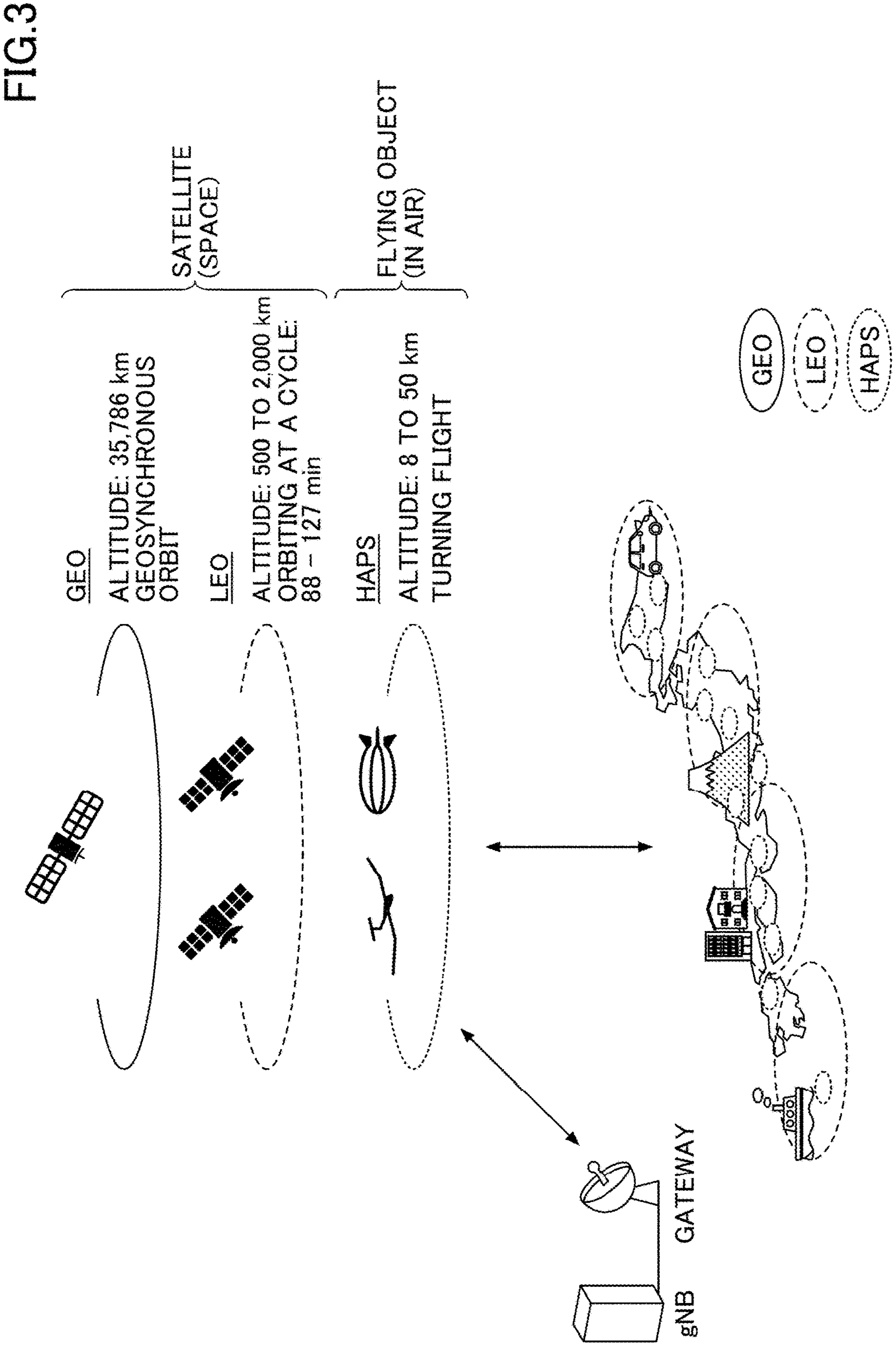
FIG. 3 is a diagram illustrating an example (3) of NTN.

FIG. 3 is a diagram illustrating an example (3) of the NTN. As illustrated in FIG. 3, the NTN is implemented by a satellite in space or a flight vehicle in the air. For example, the GEO-satellite may be a satellite located at 35,786 km in altitude and having a geosynchronous orbit. For example, the LEO satellite may be a satellite located at 500 to 2000 km in altitude and orbiting at a period of 88 to 127 minutes. For example, a high altitude platform station (HAPS) may be a flight vehicle that is located at 8 to 50 km in altitude and performs a turning flight.

As illustrated in FIG. 3, the GEO satellites, the LEO satellites, and the HAPS flight vehicles may be connected to the terrestrial station gNB via a gateway. The service areas may increase in the order of HAPS, LEO, and GEO.

For example, NTN allows the coverage of 5G networks to be extended to non-served or served areas. Also, for example, NTN can improve service continuity, availability, and reliability in ships, buses, trains, or other important communications. The NTN may be notified by transmitting a dedicated parameter to the terminal 20, and the dedicated parameter may be a parameter related to determination of timing advance (TA) based on information related to a satellite or a flight vehicle, for example.

Figure 4:
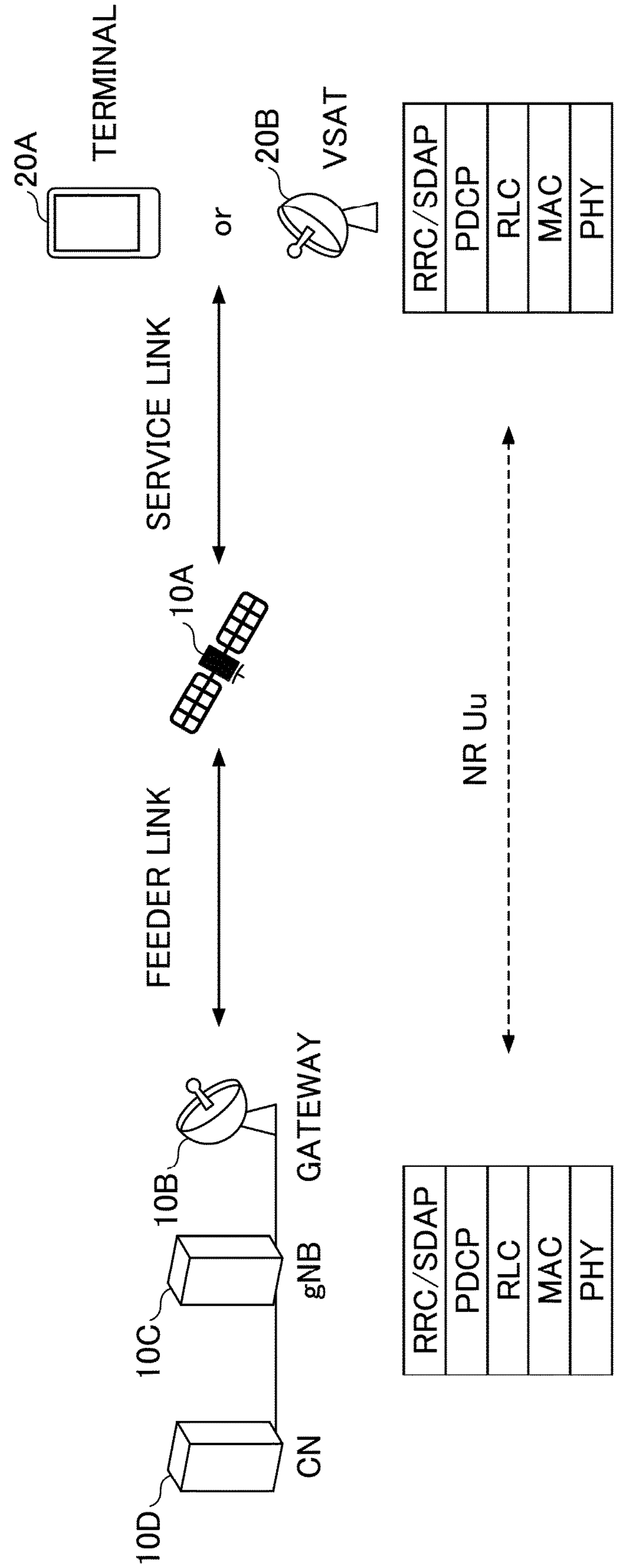
FIG. 4 is a diagram illustrating an example (4) of NTN.

FIG. 4 is a diagram illustrating an example (4) of the NTN. FIG. 4 illustrates an example of a network architecture of an NTN assumed in the case of a transparent payload. As illustrated in FIG. 4, a CN (Core Network) 10D, a gNB 10C, and a gateway 10B are connected. The gateway 10B is connected to the satellite 10A via a feeder link. The satellite 10A is connected to a terminal 20A or a VSAT (Very Small Aperture Terminal) 20B via a service link. The NR Uu is established between the gNB 10C and the terminal 20A or the VSAT 20B.

Further, as an assumption of the network architecture of the NTN, FDD may be adopted, or TDD may be possible. The terrestrial cells may be fixed or mobile. The terminal 20 may have a global navigation satellite system (GNSS) capability. For example, power class 3 handheld devices may be assumed in FR1. Also, at least in FR2, VSAT devices may be assumed.

The network architecture of the NTN may also assume regenerative payloads. For example, the gNB function may be installed in a satellite or a flight vehicle. Alternatively, the gNB-DU may be installed on a satellite or a flight vehicle, and the gNB-CU may be arranged as a terrestrial station.

Figure 5:
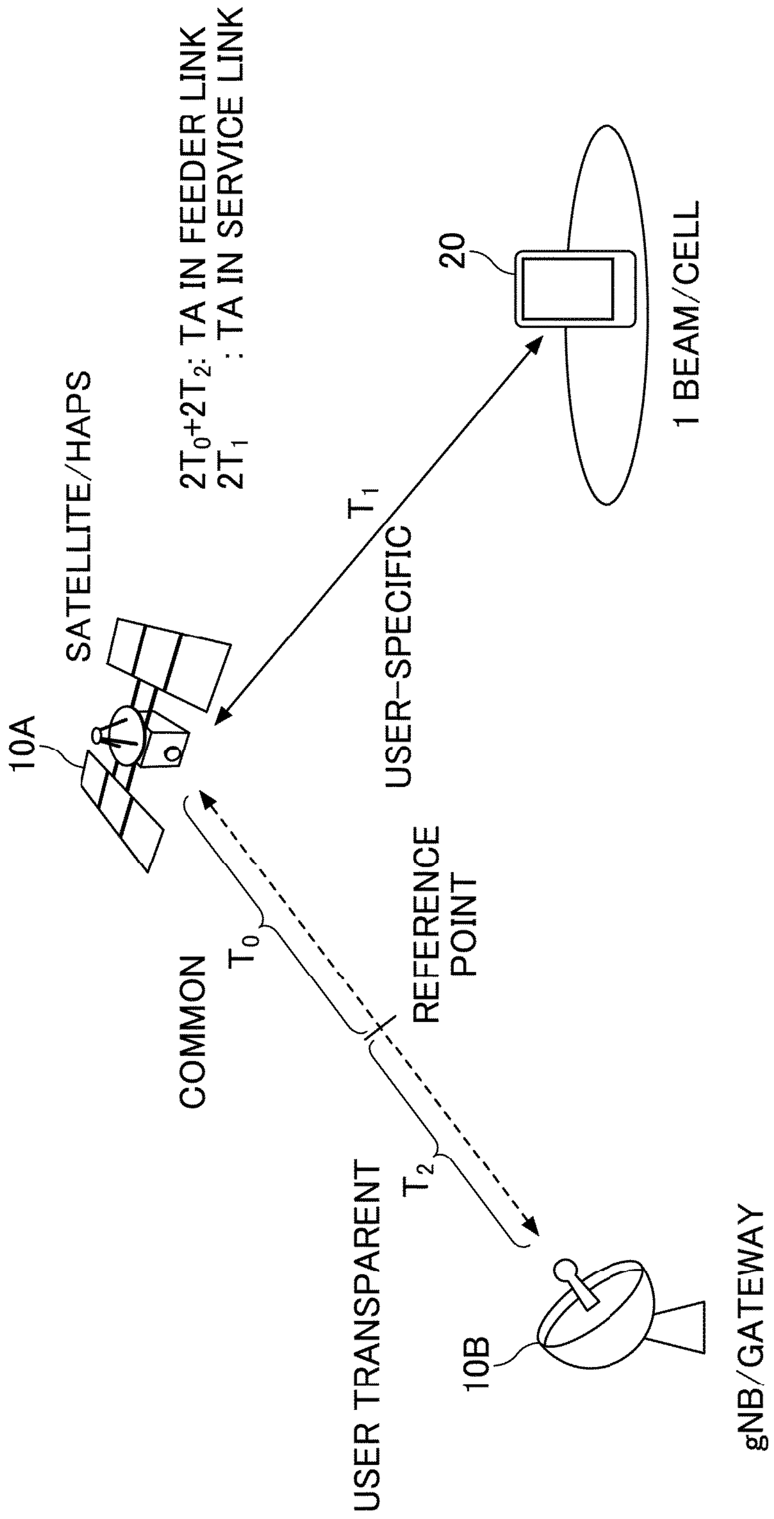
FIG. 5 is a diagram illustrating an example (5) of NTN.

FIG. 5 is a diagram illustrating an example of timing advance in the NTN. As illustrated in FIG. 5, the TA in the NTN is the sum of the TA of the feeder link and the TA of the service link. The TA of the feeder link is RTD (Round trip delay)=2 ($T_0$+$T_2$). The $T_2$ is compensated at the network side, and corresponds to a TA between a reference point and a gNB/gateway, which is a value transparent to the user. The $T_0$ is a TA common to all users. The reference point may be set to a service link, and in this case, the $T_0$ has a negative value.

The TA of the service link is RTD=2$T_1$. The $T_1$ is a user-specific TA, and differs depending on the location of the UE 20.

The TA in the NTN may be calculated by, for example, $TA=(N_{TA}+N_{TA,\ UE\text{-}specific}+N_{TA,\ common}+N_{TA,\ offset})\times T_C$. $N_{TA,\ common}$ is the TA common to all the users. Hereinafter, $N_{TA,\ common}$ is also referred to as a common TA. $N_{TA,\ UE\text{-}specific}$ is a UE specific TA. The $N_{TA}$ is notified by the TA command. $N_{TA,\ offset}$ is a fixed value defined in the specification. Note that $N_{TA,\ UE\text{-}specific}+N_{TA,\ common}$ may not be multiplied by $T_C$.

For example, in order to comply with regulations of each country related to lawful interception, emergency calls, PWS (Public Warning System), and the like, it is necessary to verify the location information of the terminal 20 on the network side. That is, the network is required to have a capability of verifying the location information reported by the terminal 20. For example, the network side needs to be able to estimate the location information of the terminal 20.

In order to verify the validity of the location information reported by the terminal 20, the network needs to have the ability to derive the location of the terminal 20. Hereinafter, how the network side, for example, a location management function (LMF) calculates the location of the terminal 20 will be examined.

Positioning in a conventional TN (Terrestrial Network) is performed by the following methods 1) to 3) (see Non-Patent Documents 4, 5, and 6).

1) Method based on DL-TDOA (Time Difference of Arrival)
2) UL-TDOA based method
3) Method based on multi-round trip time (RTT)

The positioning in the NTN in the embodiment of the present invention may reuse the positioning in the TN. For example, a Transmission Reception Point (TRP) may be a transmission point on the ground connected to a satellite. Note that the TRP may be a set of antennas at the same geographical location that support the functions of a transmission point (TP) and/or a reception point (RP). Alternatively, a satellite may be defined as a TRP.

Figure 6:
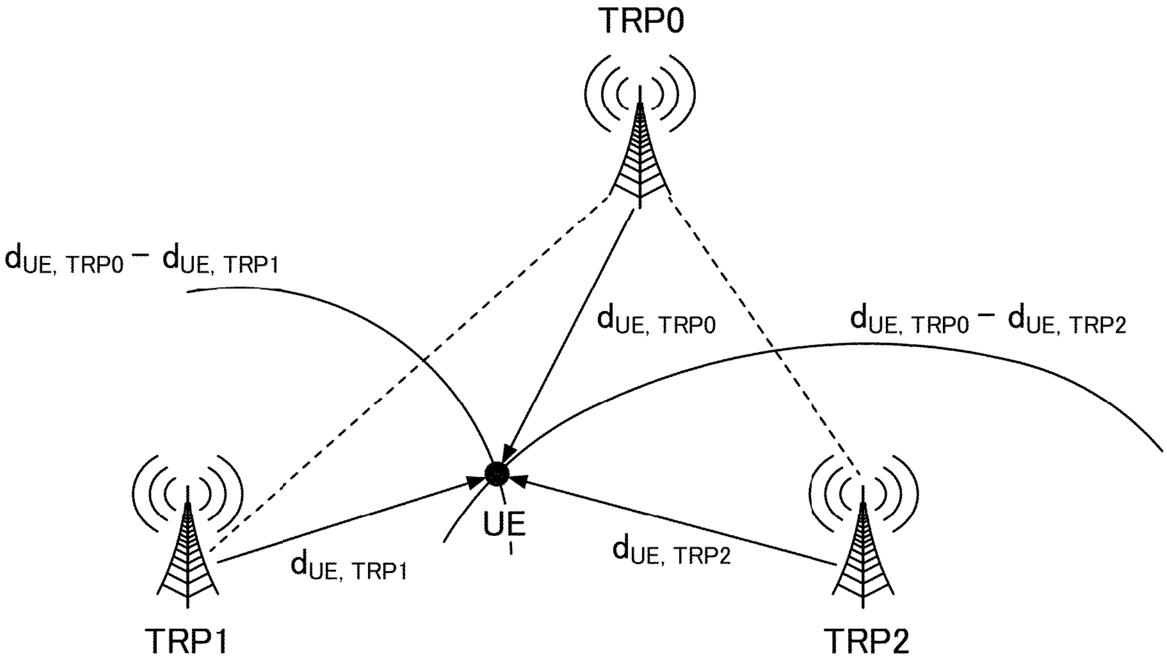
FIG. 6 is a diagram illustrating an example (1) of positioning.

FIG. 6 is a diagram illustrating an example (1) of positioning. In the TN, as illustrated in FIG. 6, the location information of the UE may be calculated based on DL-TDOA. The location of the UE may be estimated based on a DL-RSTD (Received Signal Time Difference) in which the UE measures DL radio signals transmitted from the plurality of NRs TRPs. The estimation may use the geographical location of the TRPs and the DL transmission timing at the TRP. In addition to the DL-RSTD, the location of the UE may be estimated based on the reference signal received power (RSRP) of the positioning reference signal (DL-PRS).

For example, as illustrated in FIG. 6, the delay between the UE and the TRP0, the delay between the UE and the TRP1, and the delay between the UE and the TRP2 may be measured, and the location of the UE may be calculated based on the geographical location and the DL transmission timing of each TRP.

Figure 7:
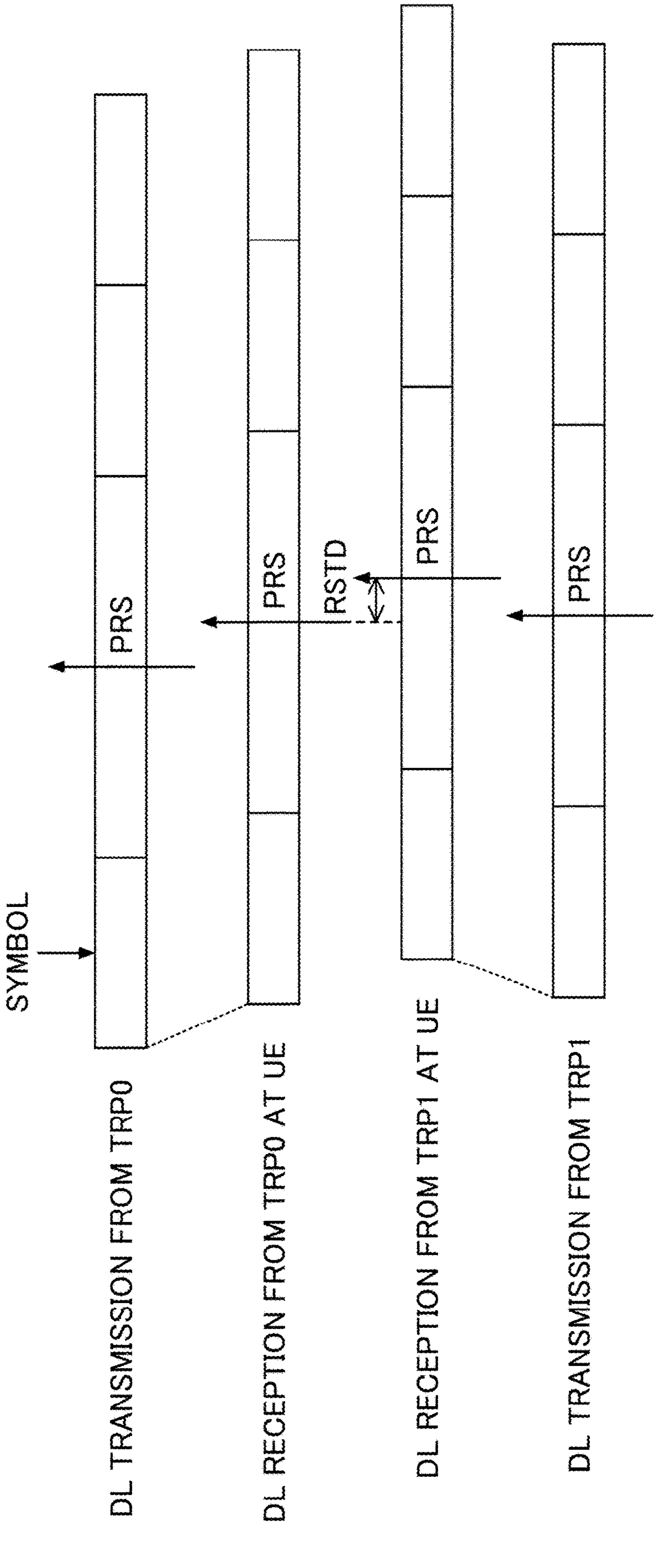
FIG. 7 is a diagram illustrating an example of measuring DL-RSTD.

FIG. 7 is a diagram illustrating an example of measuring DL-RSTD. The UE may report the DL-RSTD, which is the measurement result, to the GW and/or gNB and/or LMF via LPP (LTE Positioning Protocol). Hereinafter, "and/or" is also described as "/". As illustrated in FIG. 7, the DL-RSTD may refer to a time difference measured by the UE between the reception start time of the DL subframe of the reference TRP (TRP0 in FIG. 7) and the reception start time of the DL subframe of another TRP. The start of the subframe may be determined by detecting the DL-PRS.

The transmission timing of each TRP may not be uniform, and the gNB may report timing information related to the TRP to the LMF through an NR positioning protocol A (NRPPa). Based on the above information reported from the UE and the gNB, the LMF may calculate the UE location.

With respect to the calculation of the UE location by the DL-TDOA, the following information 1) to 5) may be reported from the UE to the GW/gNB/LMF.

1) PCI (Physical Cell ID), GCI (Global Cell ID) and TRP-ID in each measurement
2) DL-RSTD measurement result
3) DL-PRS-RSRP measurement result
4) Time stamp of measurement
5) Quality of each measurement With respect to the calculation of the UE location by DL-TDOA, the following information illustrated in 1) to 6) may be reported from the gNB to the LMF 1) PCI, GCI, and TRP-ID of TRP controlled by gNB
2) Timing information of TRP controlled by gNB
3) DL-PRS configuration of TRP controlled by gNB
4) SSB information of TRP controlled by gNB, such as time and frequency resource of SSB
5) Information on spatial direction of DL-PRS of TRP controlled by gNB
6) Information on geographical coordinates of TRP controlled by gNB The DL-RSTD may be defined as a time difference measured by the UE between a reception start time of a DL subframe of a reference TRP and a reception start time of a DL subframe of another TRP. Multiple DL-PRS resources may be used to determine a reception start time of a subframe.

As the report of the timing information related to the TRP controlled by the gNB, the SFN initialization time of the TRP may be reported. The SFN initialization time is the time at which SFN0 is started.

As a report of information on the geographical coordinates of the TRP controlled by the gNB, a point on an ellipsoid having an altitude and an ellipse indicating a range of an error may be reported (see Non-Patent Document 7).

For example, latitude, longitude, altitude, altitude direction, altitude error range, etc. may be reported.

In the TN, as illustrated in FIG. 6, based on UL-TDOA, the location information of the UE may be calculated. The location of the UE may be estimated based on UL-RTOA (Relative Time of Arrival) in which a plurality of NRs TRPs measure UL radio signals transmitted from the UE. Other setting information may be used for the estimation. In addition to the UL-RTOA, the location of the UE may be estimated based on the RSRP of the UL-SRS (Sounding Reference Signal).

For example, as illustrated in FIG. 6, the RTOA from the UE to TRP0, the RTOA from the UE to TRP1, and the RTOA from the UE to TRP2 may be measured, and the location of the UE may be calculated based on the geographical location and the UL transmission timing of each TRP.

Figure 8:
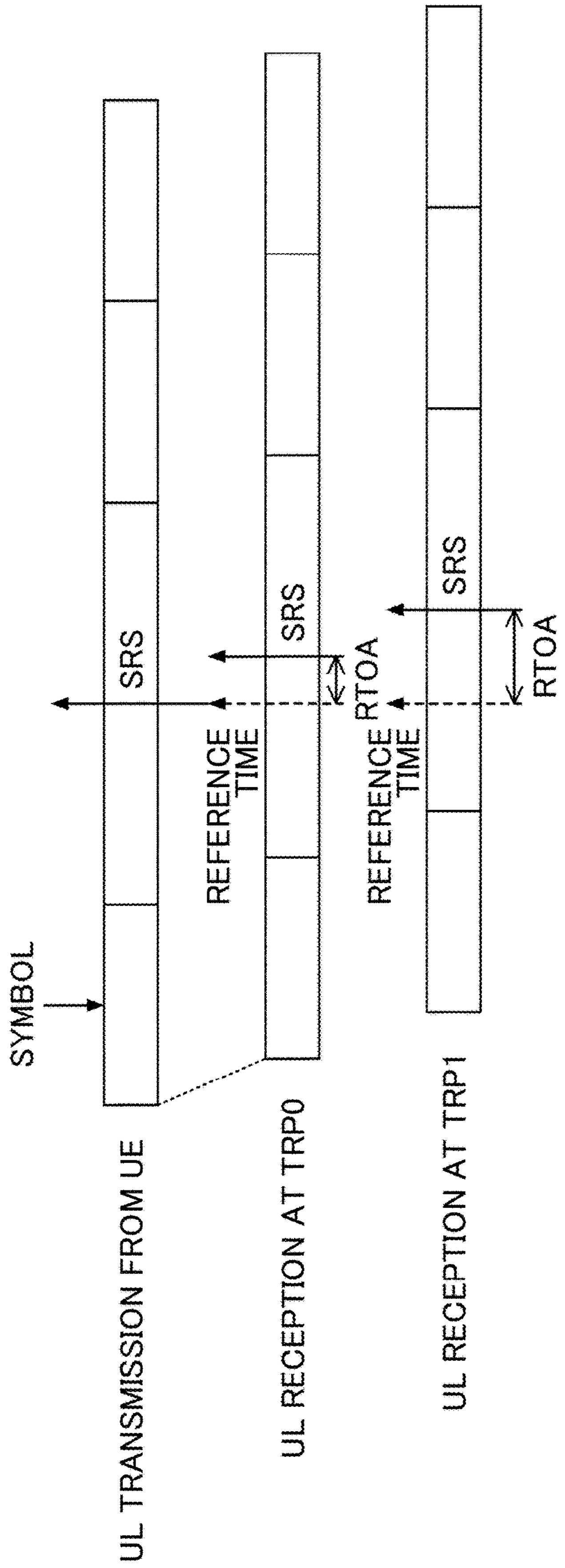
FIG. 8 is a diagram illustrating an example of measuring UL-RTOA.

FIG. 8 is a diagram illustrating an example of measuring UL-RTOA. The gNB may report the UL-RTOA, which is a measurement result, to the LMF through the NRPPa. As illustrated in FIG. 8, the UL-RTOA may refer to a time difference between a reception start time of the UL subframe including the SRS at the TRP and the RTOA reference time at which the UL is transmitted. The gNB may report the geographic coordinates of the TRP to the LMF via the NRPPa. Based on the above information reported from the gNB, the LMF may calculate the location of the UE.

With respect to the calculation of the UE location by UL-TDOA, the following information illustrated in 1) to 9) may be reported from the gNB to the LMF.

1) PCI, GCI, and TRP-ID of TRP controlled by gNB
2) SSB information of TRP controlled by gNB, such as time and frequency resource of SSB
3) Information on geographical coordinates of TRP controlled by gNB
4) NCGI (NR Cell Global Identifier) and TRP-ID of the measurement
5) UL-RTOA
6) RSRP of UL-SRS
7) Time of measurement
8) Quality of each measurement
9) Information on beam of each measurement The UL-RTOA may be defined as a time difference between a reception start time of a UL subframe including an SRS at the TRP and an RTOA reference time at which the UL is transmitted. The gNB may report the geographic coordinates of the TRP to the LMF via the NRPPa.

Figure 9:
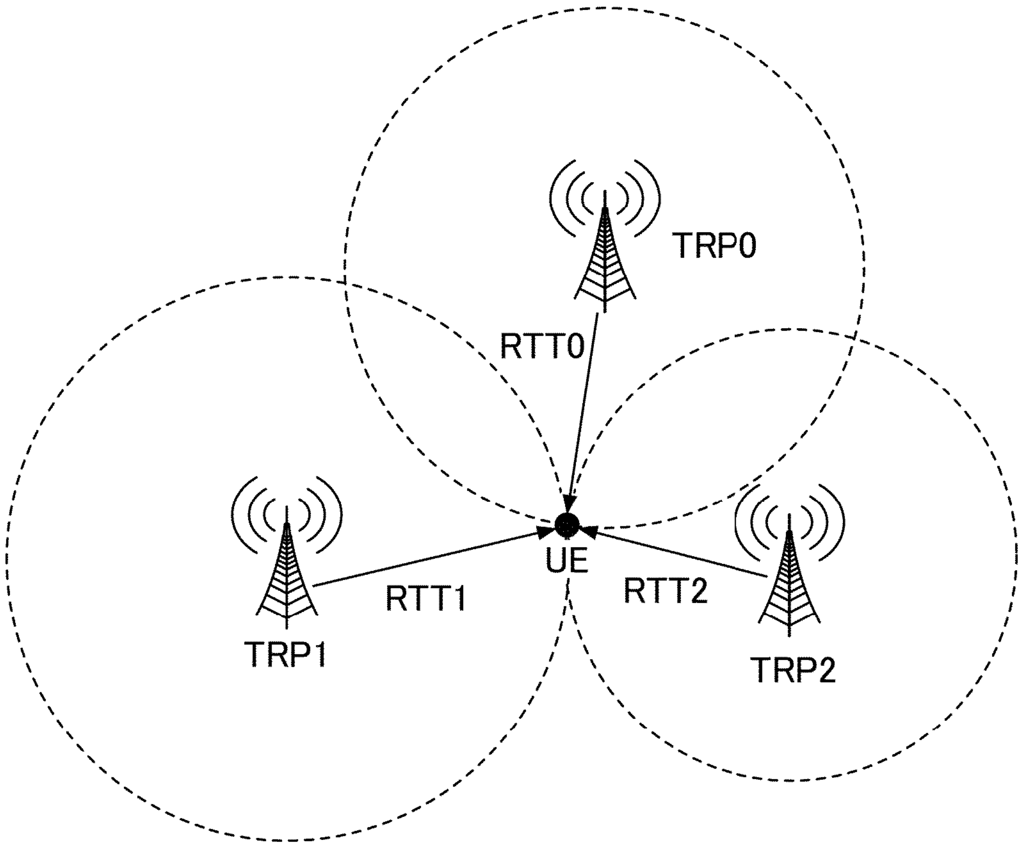
FIG. 9 is a diagram illustrating an example (2) of positioning.

FIG. 9 is a diagram illustrating an example (2) of the positioning. In the TN, as illustrated in FIG. 9, the location information of the UE may be calculated based on a plurality of RTTs. Based on UE/gNB reception-transmission time difference measurements using DL-PRS and UL-SRS, the location of the UE may be estimated. For the estimation, DL-PRS-RSRP and UL-SRS-RSRP may be used. The LMF may determine the RTT using UE/gNB reception-transmission time difference measurements.

For example, as illustrated in FIG. 9, the RTT between the UE and TRP0, the RTT between the UE and TRP1, and the RTT between the UE and TRP2 may be measured, and the location of the UE may be calculated based on the geographical location of each TRP.

Figure 10:
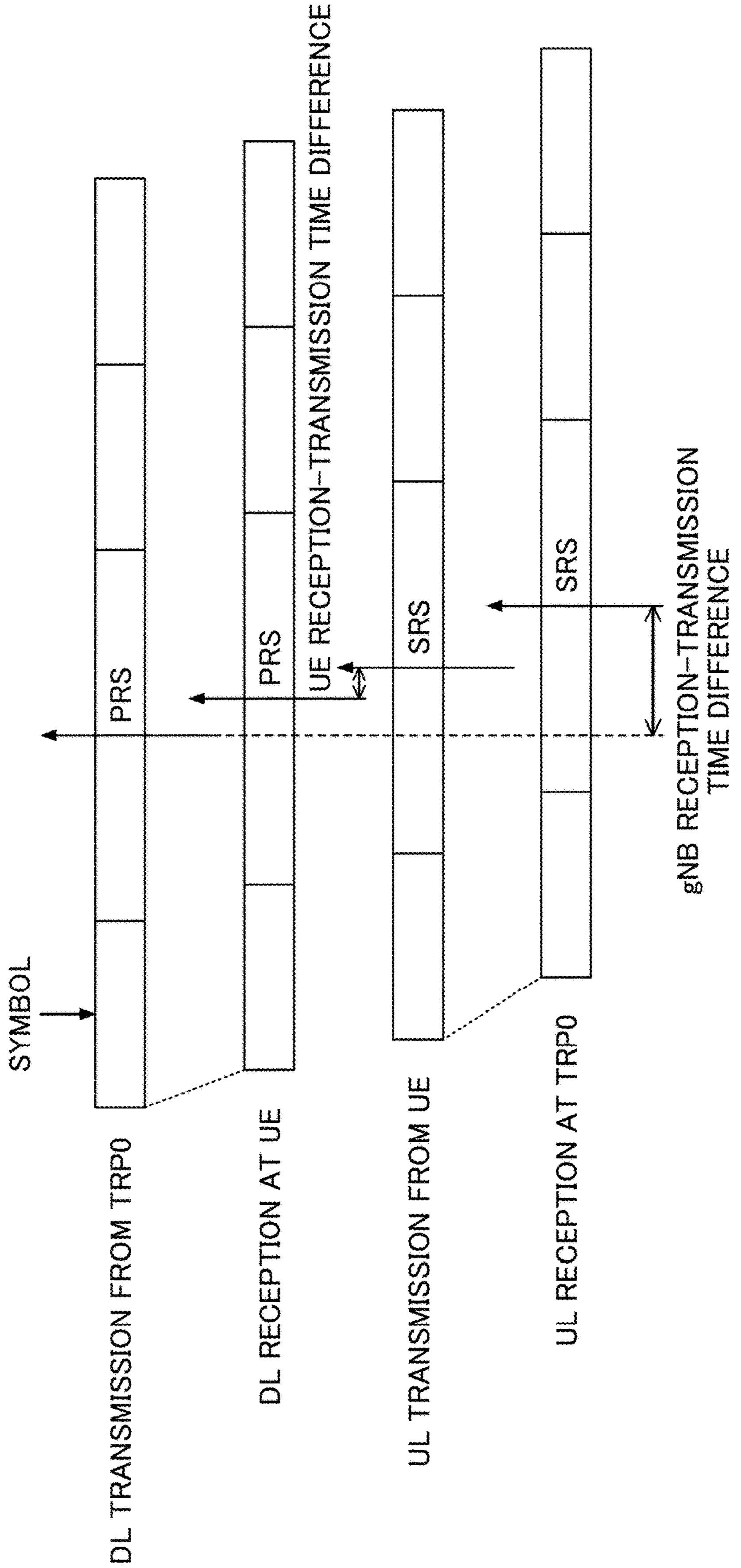
FIG. 10 is a diagram illustrating an example of measuring RTT.

FIG. 10 is a diagram illustrating an example of measuring RTT. As illustrated in FIG. 10, the UE may report the time difference between the timing of receiving the DL subframe from the TRP and the timing of transmitting the UL subframe as the UE reception-transmission time difference. Also, as illustrated in FIG. 10, the gNB may report the time difference between the timing at which the TRP receives the UL subframe and the timing at which the TRP transmits the DL subframe as the gNB reception-transmission time difference. Based on the above information reported from the UE and the gNB, the LMF may calculate the location of the UE.

With respect to the calculation of the UE location by the plurality of RTTs, information illustrated in the following 1) to 5) may be reported from the UE to the GW/gNB/LMF.

1) PCI, GCI, and TRP-ID in each measurement
2) DL-PRS-RSRP measurement result
3) UE reception-transmission time difference measurement result
4) Time of measurement
5) Quality of each measurement With respect to the calculation of the UE location by the RTT, information illustrated in the following 1) to 9) may be reported from the gNB to the LMF.

1) PCI, GCI, and TRP-ID of TRP controlled by gNB
2) Timing information of TRP controlled by gNB
3) DL-PRS configuration of TRP controlled by gNB
4) SSB information of TRP controlled by gNB, such as time and frequency resource of SSB
5) Information on spatial direction of DL-PRS of TRP controlled by gNB
6) Information on geographical coordinates of TRP controlled by gNB
7) NCGI and TRP-ID of the measurement
8) gNB reception-transmission time difference
9) RSRP of UL-SRS
10) UL-AoA (Angle of Arrival), for example, azimuth and elevation
11) Time of measurement
12) Quality of measurement
13) Information on beam of measurement Note that the definitions of the UE reception-transmission time difference and the gNB reception-transmission time difference may be referred to in Non-Patent Document 8. Similar to the DL-RSTD, the geographical coordinates of the TRP may be reported.

As described above, in the TN scenario, the DL-TDOA, UL-TDOA, and multi-RTT positioning methods using the RSTD, RTOA, and reception-transmission time difference, respectively, which indicate propagation delays between the UE and the TRP, have been applied. In contrast, in the NTN scenario, the UE location is derived from information about the propagation delay between the satellite and the UE.

Here, in the three time-based positioning methods in the NTN, it is necessary to determine what information is transmitted from the UE to the GW/gNB/LMF. It is also necessary to determine what information should be transmitted from the gNB to the LMF.

Note that the movement of the satellite should be considered as a characteristic of the NTN. As the movement of the satellite, for example, orbit information of the satellite and a common TA parameter, which are existing assistance information, may be reused.

Figure 11:
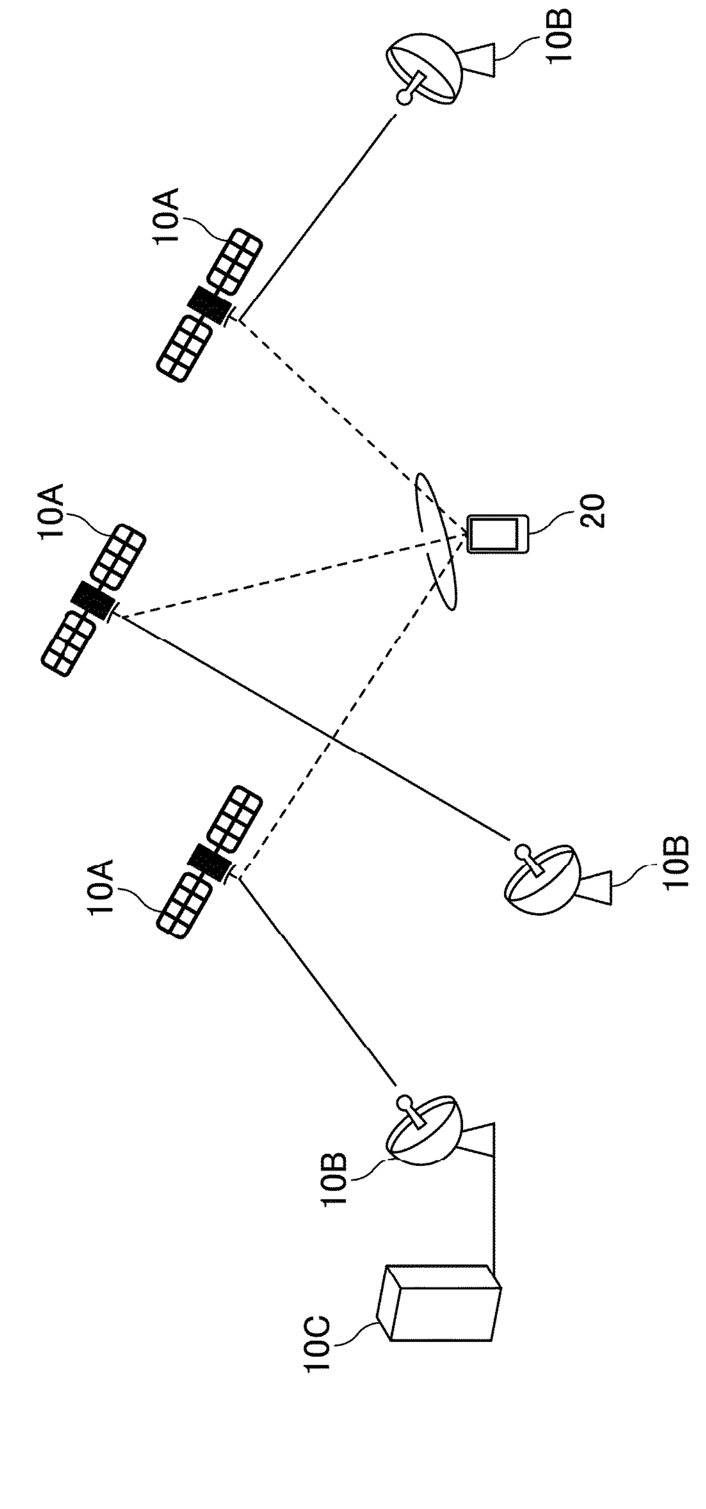
FIG. 11 is a diagram illustrating an example of an NTN in an embodiment of the present invention.

FIG. 11 is a diagram illustrating an example of the NTN in the embodiment of the present invention. In the positioning by DL-TDOA, the RSTD refers to the reception time difference of the reference signal between each of different TRPs and the UE. In the positioning by DL-TDOA in the NTN, as illustrated by the dashed lines in FIG. 11, RSTD refers to the reception time difference of the reference signals between different satellites and the UE. Here, the LMF does not know how to accurately obtain the RSTDs from different satellites to the UE. In addition, in the positioning by DL-TDOA in the NTN, the LMF needs to acquire the geographical location of each satellite, but it is unclear how to report the location of the satellite to the LMF.

In the positioning by the UL-TDOA, the RTOA refers to the reception time of the SRS at the TRP with reference to the RTOA reference time. In the positioning by UL-TDOA in the NTN, RTOA needs to consider feeder links and service links, unlike TN. That is, the reception time at the satellite is required. Here, the LMF does not know how to accurately acquire the RTOA from different satellites. In addition, in the positioning by UL-TDOA in the NTN, the LMF needs to acquire the geographical location of each satellite, but it is unclear how to report the location of the satellite to the LMF.

In addition, in the positioning by a plurality of RTTs, the UE/gNB reception-transmission time difference refers to the reception-transmission time difference from different TRPs to the UE in the UE/gNB. In the positioning by a plurality of RTTs in the NTN, the reception-transmission time difference needs to consider the reception-transmission time difference from the satellite to the UE. Here, the LMF does not know how to accurately obtain the RTTs to the different satellites and the UE. In addition, in the positioning by multiple RTTs in the NTN, the LMF needs to acquire the geographical location of each satellite, but it is unclear how to report the location of the satellite to the LMF.

Therefore, the following proposals 1) to 4) may be executed.

Proposal 1) Report on DL-RSTD by UE and report on timing information by gNB

Proposal 2) Report on satellite locations by gNB

Proposal 3) Report on UL-RTOA by gNB

Proposal 4) Report on reception-transmission time difference by UE and report on reception-transmission time difference by gNB Proposal 1) The UE may support reporting of DL reception time difference to the GW/gNB/LMF via LPP. Note that, hereinafter, the TRP may be a satellite.

The UE may report the measured DL reception time difference from the two TRPs. The two TRPs are two TRPs controlled by the same gNB, and may be connected to two satellites. The two satellites may be connected to the same or different GWs. Alternatively, the two TRPs may be two TRPs controlled by two gNBs respectively and connected to two satellites. The two satellites may be connected to the same or different GWs. Note that the information reported from the UE may be transferred to the LMF via the TRP/gNB/GW.

The gNB may also report timing information of information 1) to information 4) illustrated below to the LMF via the NRPPa.

Information 1) SFN initialization time in the TRP controlled by the gNB or the GW, measured by the gNB. Hereinafter, the SFN initialization time in TRPx is referred to as T_x.

Information 2) Propagation delay between TRP controlled by gNB or GW and satellite calculated by gNB. Further, the gNB may report, to the LMF as information 2a, assistance information for the LMF to calculate the propagation delay.

Information 3) Propagation delay between a TRP controlled by the gNB or the GW and the reference point, calculated by the gNB. Hereinafter, the propagation delay in TRPx is referred to as Ta_x. Further, the gNB may report, to the LMF as information 3a, assistance information for the LMF to calculate the propagation delay. The reference point may be a reference point defined for NTN in 3GPP Release 17. That is, the reference point serves as a reference of the DL timing and the UL timing. Alternatively, the reference point may be newly defined.

Information 4) Propagation delay between the reference point and the satellite, calculated by the gNB. Hereinafter, the propagation delay related to TRPx is referred to as Tb_x. Further, the gNB may report assistance information for the LMF to calculate the propagation delay to the LMF as information 4a. The reference point may be a reference point defined for NTN in 3GPP Release 17. That is, the reference point serves as a reference of the DL timing and the UL timing. Alternatively, the reference point may be newly defined.

For the reporting of the information 1) to the information 4), option 1) to option 9) described below may be applied. Note that option 5) to option 9) are options when two TRPs are connected to the same gNB.

Option 1) Information 1 and Information 2 (or information 2a) may be separately reported for each TRP/TRP pair.

Option 2) For each TRP/TRP pair, information 1, information 3 (or information 3a), and information 4 (or information 4a) may be separately reported.

Option 3) For each TRP/TRP pair, the gNB may calculate Information 1 and Information 2 as one value and report the value to the LMF. For example, the SFN initialization time at the satellite obtained by adding, to the SFN initialization time at the TRP/GW/gNB, the propagation delay from the TRP/GW/gNB to the satellite may be defined as the one value.

Option 4) For each TRP/TRP pair, the gNB may calculate Information 1 and Information 3 as one value and report the value to the LMF. For example, the SFN initialization time at the reference point obtained by adding the propagation delay from the TRP/GW/gNB to the reference point to the SFN initialization time at the TRP/GW/gNB may be defined as the one value. Further, the gNB may additionally or separately report the information 4 to the LMF.

Option 5) If two TRPs are connected to the same gNB or different gNBs, the gNB may calculate and report the time difference between TRPx and TRPy to the LMF. For example, three values of T_x−T_y, Ta_x−Ta_y, and Tb_x−Tb_y may be reported.

Option 6) If two TRPs are connected to the same gNB or different gNBs, the gNB may calculate the time difference of Information 1 and Information 3 between TRPx and TRPy and report it to the LMF as one value. For example, (T_x−T_y)+(Ta_x−Ta_y) may be reported. Further, the gNB may additionally or separately calculate and report to the LMF the time difference of information 4 between TRPx and TRPy. For example, Tb_x−Tb_y may be reported.

Option 7) If two TRPs are connected to the same gNB or different gNBs, the gNB may calculate the time difference of information 3 and information 4 between TRPx and TRPy and report the time difference to the LMF as one value. For example, (Ta_x−Ta_y)+(Tb_x−Tb_y) may be reported. Further, the gNB may additionally or separately calculate and report the time difference of information 1 between TRPx and TRPy to the LMF. For example, T_x−T_y may be reported.

Option 8) If two TRPs are connected to the same gNB or different gNBs, the gNB may calculate the time difference between the information 1 and the information 2 of the TRPx and the TRPy and report the time difference as one value to the LMF. The one value corresponds to the time difference of the propagation delay from the TRP/GW/gNB to the satellite, for example, (T_x−T_y)+(Ta_x−Ta_y)+(Tb_x−Tb_y) may be reported.

Option 9) If the two TRPs are connected to the same gNB or different gNBs, the gNB may calculate the difference between TRPx and TRPy in the same way as the RSTD reported by the UE, so as to obtain the time difference between TRPx and TRPy of the propagation delay from the satellite to the UE, and report the time difference to the LMF, or the time difference may be directly applied to the LMF.

In the above option 5) to option 8), when the transmission times at two TRPs are exactly the same, (T_x−T_y)=0 is satisfied at the TRP/GW/gNB. Further, at the reference point, (T_x−T_y)+(Ta_x−Ta_y)=0 is satisfied. At the satellite, (T_x−T_y)+(Ta_x−Ta_y)+(Tb_x−Tb_y)=0 is satisfied.

The above operations allow the extension of DL-TDOA positioning in the TN to the NTN scenarios. In addition, the UE and the gNB may report necessary information to the LMF. In addition, when one value corresponding to a plurality of pieces of information (for example, information 1 to information 4) in a certain TRP is reported, or when one value corresponding to a plurality of pieces of information related to two TRPs of which a difference is reported is reported, signaling overhead can be reduced. In addition, when a plurality of pieces of information corresponding to a certain TRP are reported as a plurality of values, for example, when each piece of information is separately reported, or when a plurality of pieces of information related to two TRPs are reported as a plurality of values, for example, when information is reported for each TRP, calculation resources required for the gNB may be reduced, and different parts of information are clarified.

Figure 12:
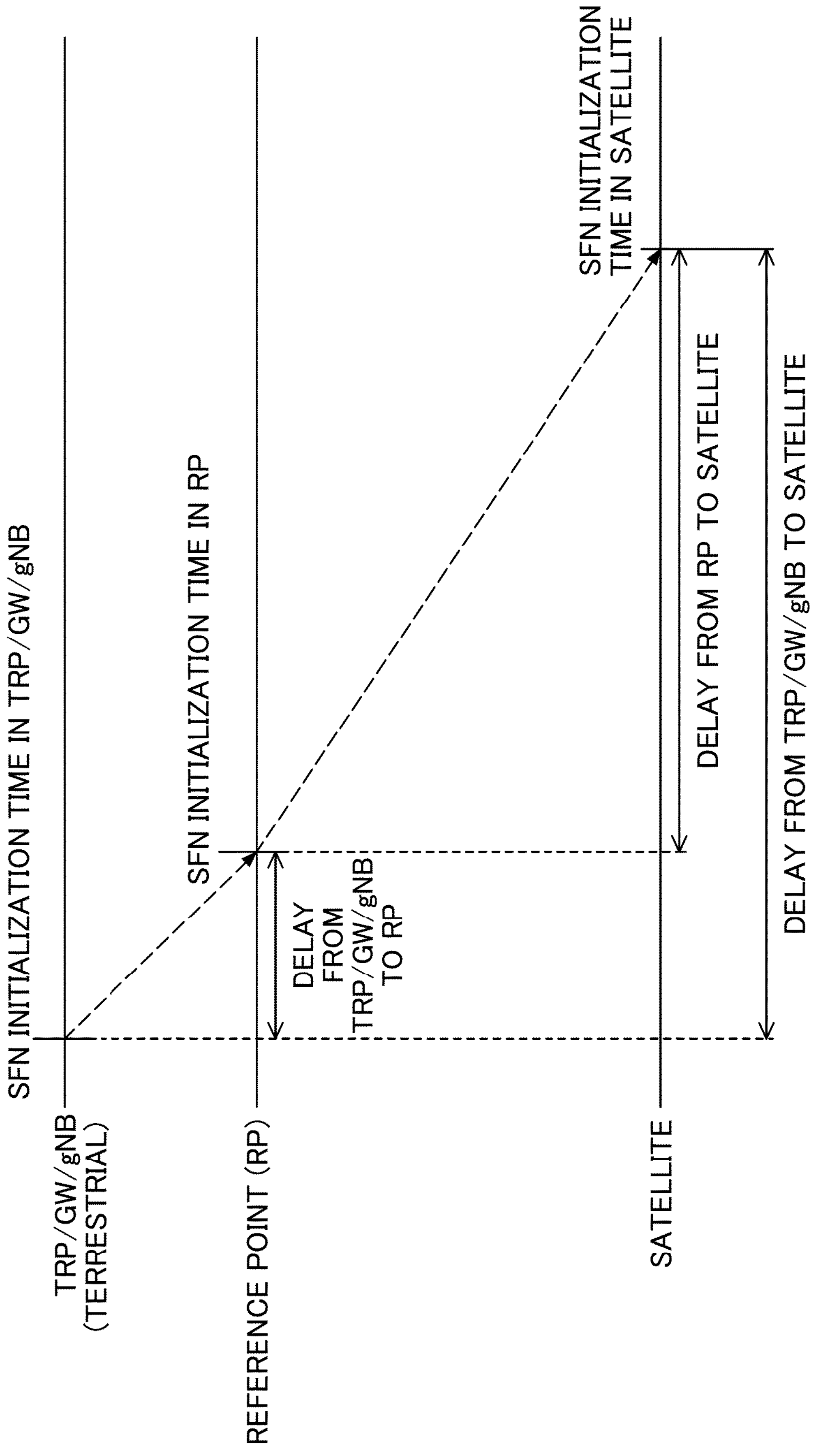
FIG. 12 is a diagram illustrating an example of SFN initialization time in the embodiment of the present invention.

FIG. 12 is a diagram illustrating an example of the SFN initialization time in the embodiment of the present invention. As illustrated in FIG. 12, the time obtained by adding the delay from the TRP/GW/gNB to the reference point to the initialization time at the TRP/GW/gNB is the SFN initialization time in the reference point. The time obtained by adding the delay from the reference point to the satellite to the initialization time at the reference point is the SFN initialization time at the satellite. Further, the time obtained by adding the delay from the TRP/GW/gNB to the satellite to the initialization time at the TRP/GW/gNB is the SFN initialization time at the satellite.

Figure 13:
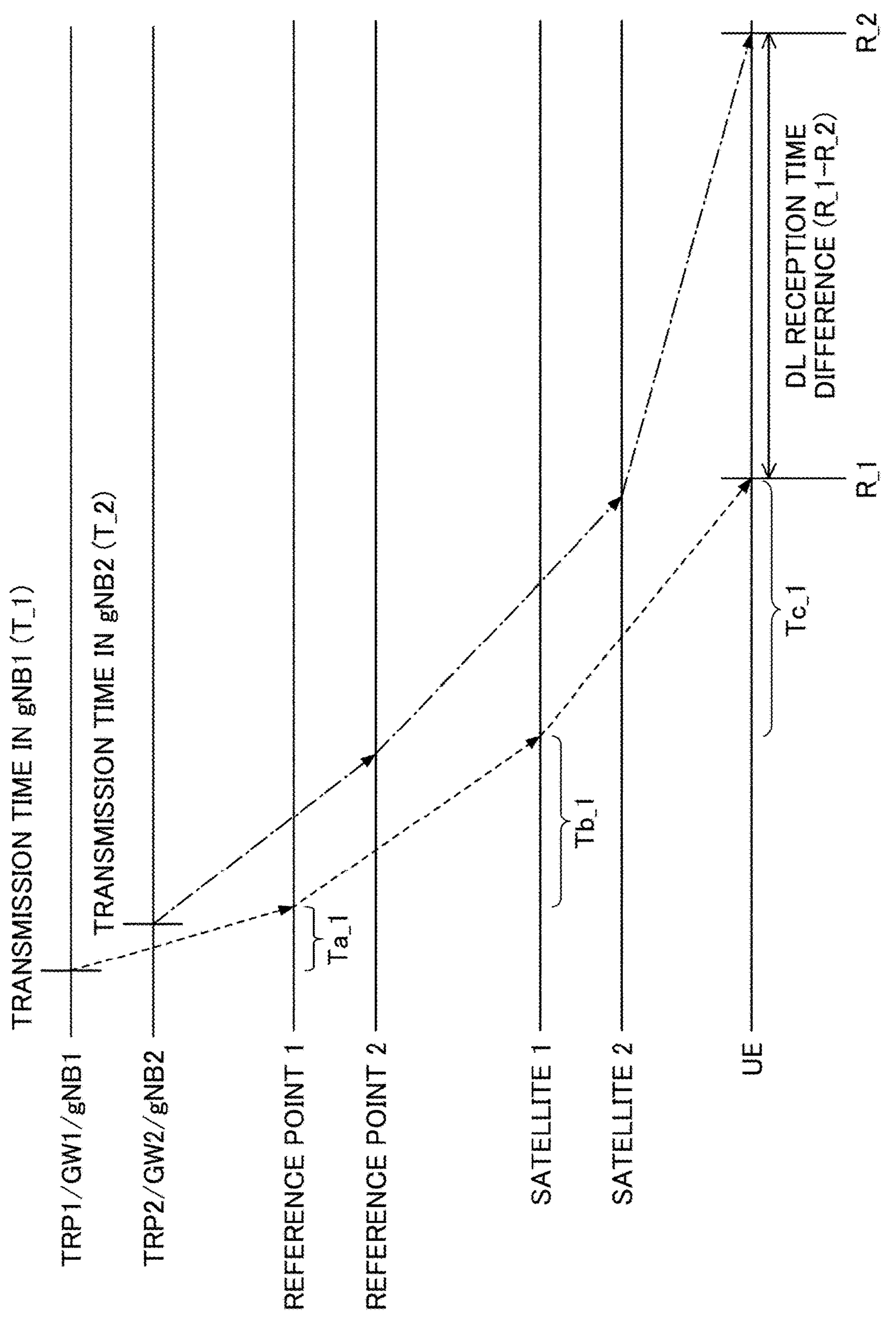
FIG. 13 is a diagram illustrating an example of a DL reception time difference in the embodiment of the present invention.

FIG. 13 is a diagram illustrating an example of a DL reception time difference in the embodiment of the present invention. As illustrated in FIG. 13, hereinafter, the propagation delay between the satellite and the UE for TRPx is denoted as Tc_x, and the DL reception time difference at the UE for TRPx and TRPy is denoted as R_x−R_y. FIG. 13 is described for TRP1 and TRP2. Here, R_x−R_y=(T_x−T_y)+(Ta_x−Ta_y)+(Tb_x−Tb_y)+(Tc_x−Tc_y). The LMF requires a value for Tc_x, for example, (Tc_x−Tc_y), to calculate the UE location. Referring to FIG. 13, values reported to the LMF in the above option 1) to option 9) are described below. The report of the UE may be reported to the LMF via the gNB.

Option 1) The UE reports R_x−R_y for each TRP pair, and the gNB reports two values: T_x and Ta_x+Tb_x for each TRP.

Option 2) The UE reports R_x−R_y for each TRP pair, and the gNB reports three values: T_x, Ta_x, and Tb_x for each TRP.

Option 3) The UE reports R_x−R_y for each TRP pair, and the gNB reports one value: T_x+Ta_x+Tb_x for each TRP.

Option 4) The UE reports R_x−R_y for each TRP pair and the gNB reports two values: T_x+Ta_x and Tb_x for each TRP.

Option 5) If two TRPs are connected to the same gNB or different gNBs, the UE reports R_x−R_y and the gNB reports three values: T_x−_Ty, Ta_x−Ta_y, and Tb_x−Tb_y.

Option 6) If two TRPs are connected to the same gNB or different gNBs, the UE reports R_x−R_y and the gNB reports two values: (T_x−T_y)+(Ta_x−Ta_y) and Tb_x−Tb_y.

Option 7) If two TRPs are connected to the same gNB or different gNBs, the UE reports R_x−R_y and the gNB reports two values: T_x−T_y and (Ta_x−Ta_y)+(Tb_x−Tb_y).

Option 8) If two TRPs are connected to the same gNB or different gNBs, the UE reports R_x−R_y and the gNB reports one value: (T_x−T_y)+(Ta_x−Ta_y)+(Tb_x−Tb_y).

Option 9) If two TRPs are connected to the same gNB or different gNBs, the UE reports R_x−R_y and the gNB reports one value: (R_x−R_y)−(T_x−T_y)−(Ta_x−Ta_y)−(Tb_x−Tb_y). This value corresponds to Tc_x−Tc_y.

It should be noted that the TRP/GW/gNB, the reference point, and the satellite may be a single point (i.e., the same geographical location) in the NTN. When the TRP/GW/gNB is the single point, Ta_x+Tb_x=0, and it is assumed that the TRP/GW/gNB is mounted on a satellite. Also, when Ta_x=0, the TRP/GW/gNB and the reference point are assumed to be a single point, and when Tb_x=0, the reference point and the satellite are assumed to be a single point.

Figure 14:
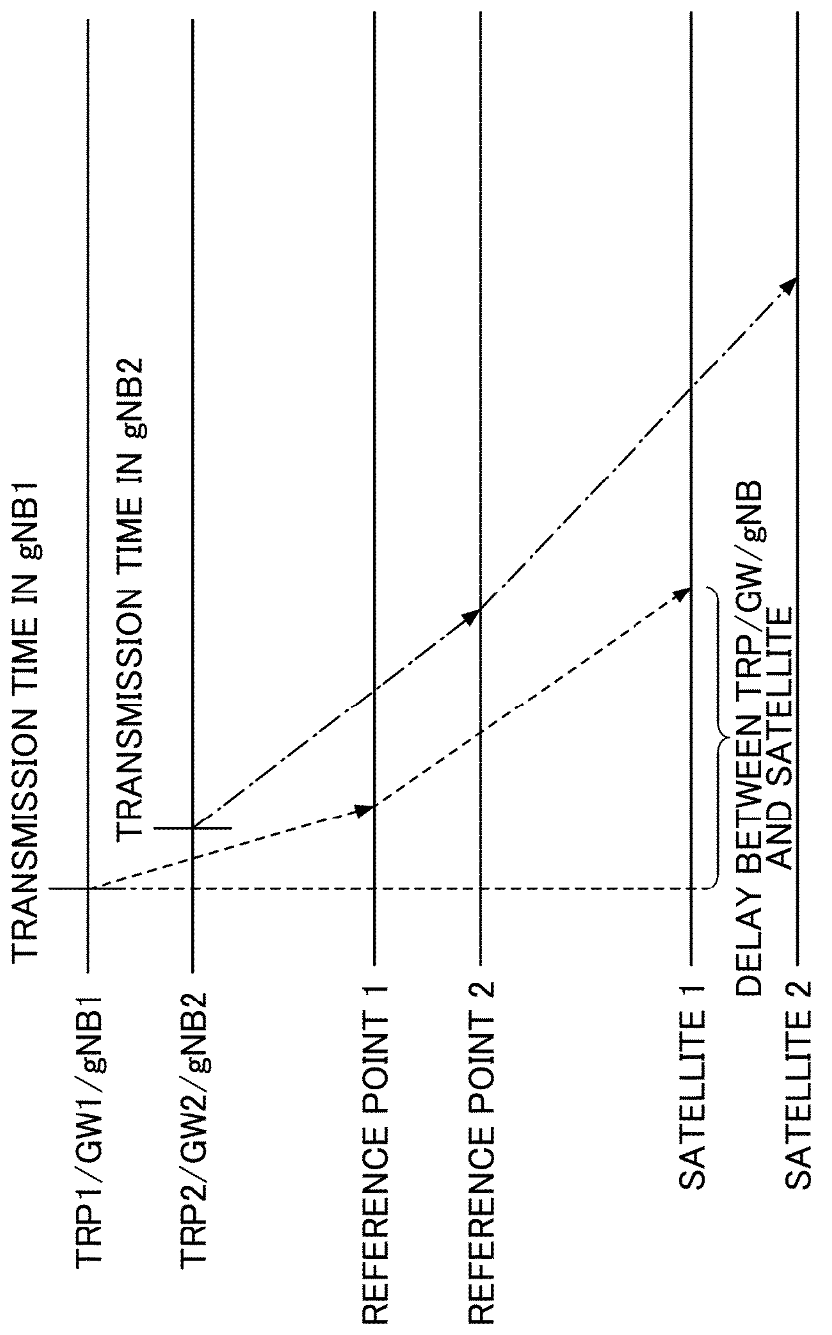
FIG. 14 is a diagram illustrating an example of a delay between a TRP and a satellite according to the embodiment of the present invention.

FIG. 14 is a diagram illustrating an example of the delay between the TRP and the satellite in the embodiment of the present invention. The gNB may report, to the LMF, information on the delay between the TRP controlled by the gNB or the GW and the satellite as illustrated in FIG. 14.

For example, the gNB may directly report the value of the delay between the TRP controlled by the gNB or the GW and the satellite. The sum of K_mac and common TA may be used in the same way as 3GPP Release 17 feeder link delay information, e.g., the one way-propagation delay/distance report via NRPPa messages reporting the delay between the TRP/GW/gNB and the satellite. K_mac may be a parameter related to determination of the timing of applying the configuration received in the MAC-CE. In addition, a new information element (IE) may be introduced, or new information may be introduced into an existing IE.

For example, the gNB may report the location of the TRP controlled by the gNB or the GW to the LMF. The LMF may calculate the delay between the TRP controlled by the gNB or GW and the satellite based on the location. The existing TRP geographical coordinate report may be used for the report on the location of the TRP controlled by the gNB or the GW. The reporting of the satellite positions will be described later.

Figure 15:
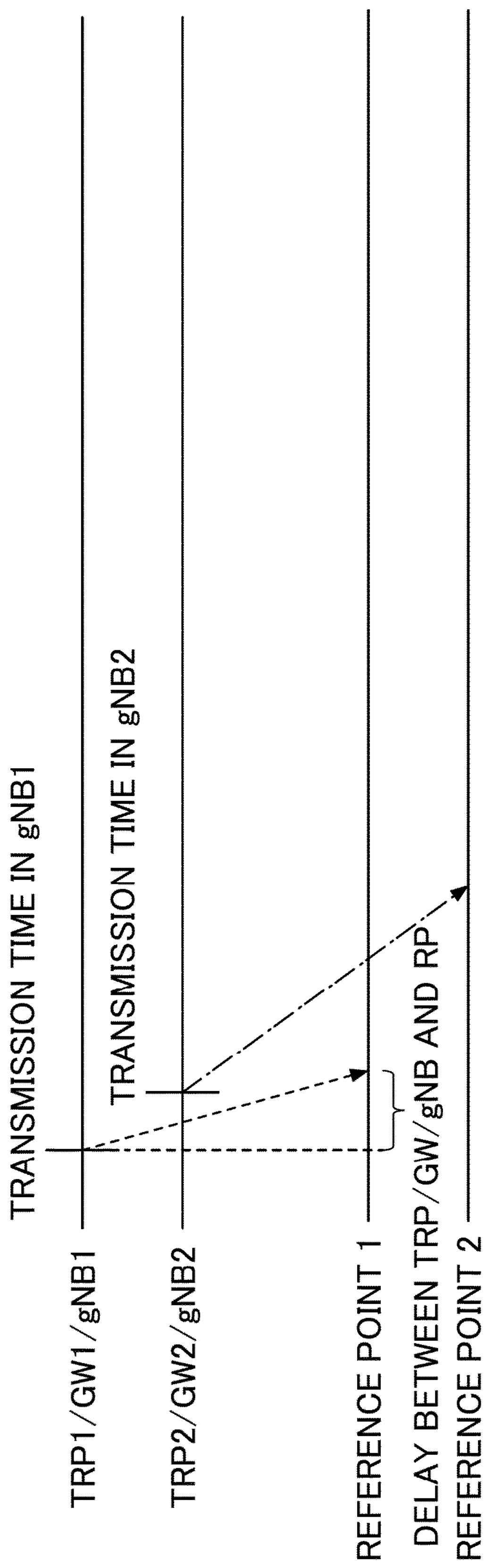
FIG. 15 is a diagram illustrating an example of a delay between a TRP and an RP according to the embodiment of the present invention.

FIG. 15 is a diagram illustrating an example of a delay between a TRP and an RP according to the embodiment of the present invention. The gNB may report, to the LMF, information on the delay between the TRP controlled by the gNB or the GW and the reference point as illustrated in FIG. 15.

For example, the gNB may directly report the value of the delay between the TRP controlled by the gNB or the GW and the reference point. K_mac may be reused, for example, in the same way as the report on the one-way propagation delay/distance via an NRPPa message reporting the delay between the TRP/GW/gNB and the reference point in 3GPP Release 17. Further, a new IE may be introduced, or new information may be introduced into an existing IE.

For example, the gNB may report the location of the TRP controlled by the gNB or the GW and the location of the reference point to the LMF. The LMF may calculate the delay between the TRP controlled by the gNB or the GW and the reference point based on the location. The existing TRP geographical coordinate report may be used for the report on the location of the TRP controlled by the gNB or the GW. When the same definition as that of the reference point in 3GPP Release 17 is applied to the report on the location of the reference point, that is, when the reference point is a synchronization point of DL/UL timing, the location information of the reference point in 3GPP Release 17 may be applied.

Alternatively, existing reports of geographic coordinates may be reused.

Figure 16:
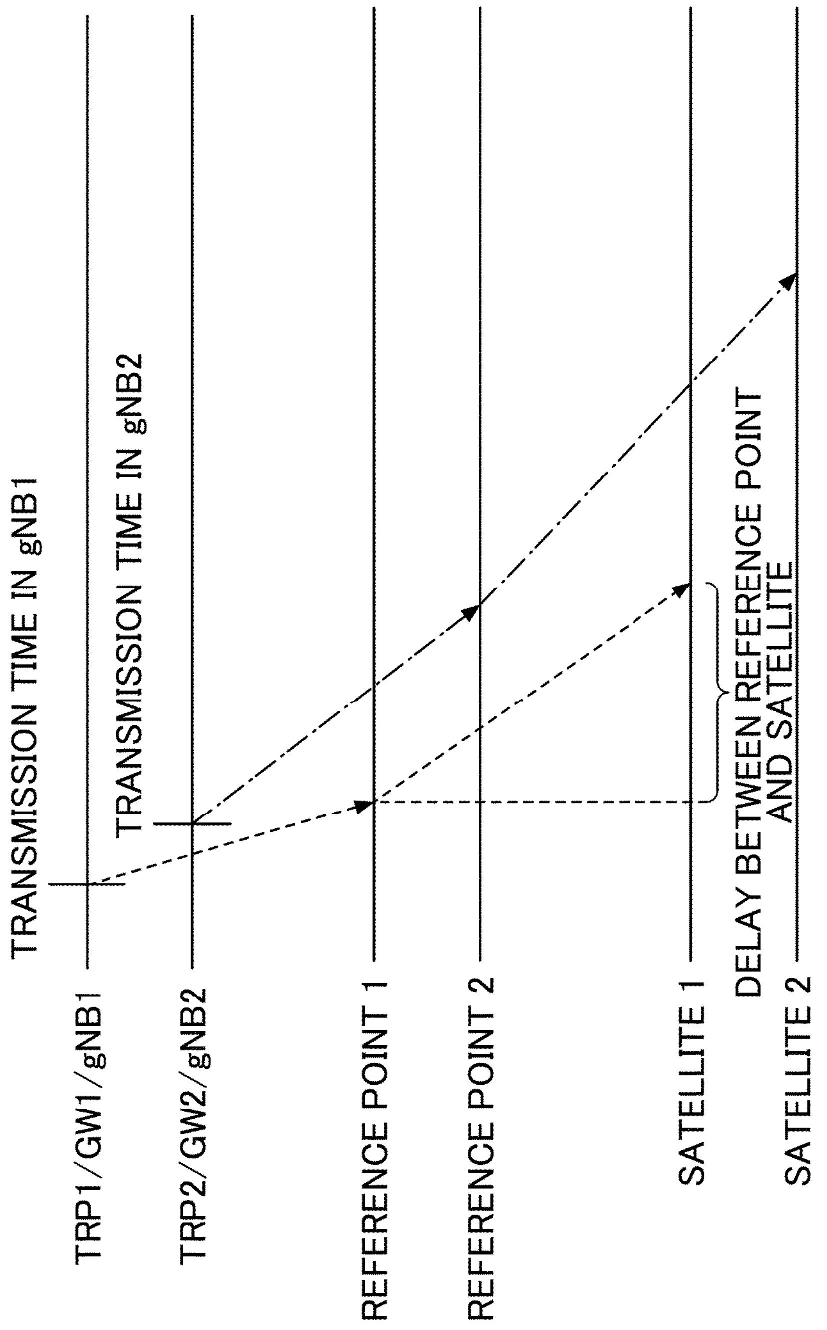
FIG. 16 is a diagram illustrating a delay between an RP and a satellite according to the embodiment of the present invention.

FIG. 16 is a diagram illustrating the delay between the RP and the satellite in the embodiment of the present invention. The gNB may report information on the delay between the reference point and the satellite to the LMF, as illustrated in FIG. 16.

For example, the gNB may directly report the value of the delay between the reference point and the satellite. In 3GPP Release 17, as, for example, the one-way propagation delay/distance report via NRPPa messages and the common TA are for reporting the delay between the TRP/GW/gNB and the reference point, these may be re-used. Further, a new IE may be introduced, or new information may be introduced into an existing IE.

Also, for example, the gNB may report the location of the reference point and the location of the satellite to the LMF. The LMF may calculate the delay between the reference point and the satellite based on the locations. The location report of the reference point configured in the network may reuse the NRPPa message. A new IE may be introduced, or new information may be introduced into an existing IE.

For example, a new NRPPa message for location reporting of the reference point may be defined, and a new field of the IE indicating the geographical coordinates of the NTN reference point may be added to the existing NRPPa message.

Proposal 2) The gNB may report information on the location of the satellite to the LMF. For example, the gNB may report the geographic coordinates of the satellites via the NRPPa message. The 3GPP Release 17 TRP geographic coordinate report may be reused for the satellite geographic coordinate report. A new IE may be introduced, or new information may be introduced into an existing IE. For example, a new NRPPa message for the location report of the satellite may be defined, and a new field of the IE indicating the geographic coordinates of the satellite may be added to the existing NRPPa message.

For example, the gNB may report the location of the satellite to the LMF as {X, Y, Z} [m] in an Earth-centered, Earth-fixed coordinate system (ECEF coordinate system) and the velocity {VX, VY, VZ}[m/s].

Also, for example, the gNB may report orbit information of the satellite to the LMF. For example, the activation semi-major axis c [m], eccentricity e, argument of periapsis co [rad], longitude of the ascending node Q [rad], inclination i [rad], and mean anomaly M [rad] at epoch time t0 may be reported.

Proposal 3) The gNB may support reporting of UL reception time to the LMF via NRPPa. For example, the gNB may report to the LMF the reception time of the UL-SRS measured by the gNB relative to the RTOA reference time in the TRP controlled by the gNB or the GW. Note that the TRP may be a satellite.

The gNB may report timing information of information 1) to information 3) illustrated below to the LMF via the NRPPa.

Information 1) Propagation delay between TRP controlled by gNB (or gNB and GW) and satellite calculated by gNB. Further, the gNB may report assistance information for the LMF to calculate the propagation delay to the LMF as information 1a.

Information 2) Propagation delay between a TRP controlled by the gNB (or the gNB and the GW) and the reference point, calculated by the gNB. Hereinafter, the propagation delay in TRPx is referred to as Ta_x. Further, the gNB may report assistance information for the LMF to calculate the propagation delay to the LMF as information 2a. The reference point may be a reference point defined in 3GPP Release 17. That is, the reference point serves as a reference of the DL timing and the UL timing. Alternatively, the reference point may be newly defined.

Information 3) Propagation delay between the reference point and the satellite, calculated by the gNB. Hereinafter, the propagation delay related to TRPx is referred to as Tb_x. Further, the gNB may report assistance information for the LMF to calculate the propagation delay to the LMF as information 3a. The reference point may be a reference point defined in 3GPP Release 17. That is, the reference point serves as a reference of the DL timing and the UL timing. Alternatively, the reference point may be newly defined.

For the reporting of the information 1) to the information 3), option 1) to option 8) described below may be applied. Note that option 5) to option 8) are options in a case where two TRPs are connected to the same gNB. Note that the UL-RTOA received by the TRPx is referred to as RTOA_x.

Option 1) For each TRP, the UL-RTOA and Information 1 (or Information 1a) may be separately reported.

Option 2) For each TRP, UL-RTOA, Information 2 (or Information 2a), and Information 3 (or Information 3a) may be separately reported.

Option 3) For each TRP, the gNB may calculate UL-RTOA and Information 1 as one value and report it to the LMF. For example, as the RTOA in the satellite, a time obtained by subtracting a propagation delay from the TRP/GW/gNB to the satellite from the UL-SRS reception time at the TRP/GW/gNB may be defined as the one value.

Option 4) For each TRP, the gNB may calculate UL-RTOA and Information 2 as one value and report it to the LMF. For example, as the RTOA at the reference point, a time obtained by subtracting a propagation delay from the TRP/GW/gNB to the reference point from the UL-SRS reception time at the TRP/GW/gNB may be defined as the one value. Further, the gNB may additionally or separately report the information 3 to the LMF.

Option 5) If two TRPs are connected to the same gNB or different gNBs, the gNB may calculate the time difference of the information 1 between TRPx and TRPy and the time difference of the UL-RTOA between TRPx and TRPy and report the time differences to the LMF. For example, two values of Ta_x−Ta_y and Tb_x Tb_y may be reported as the time difference of the information 1.

Option 6) If two TRPs are connected to the same gNB or different gNBs, the gNB may calculate the time difference of UL-RTOA between TRPx and TRPy and the time difference of Information 2 and report the calculated time differences as one value to the LMF. For example, (RTOA_x−RTOA_y)−(Ta_x−Ta_y) may be reported. Further, the gNB may additionally or separately calculate and report to the LMF the time difference of information 3 between TRPx and TRPy. For example, Tb_x−Tb_y may be reported.

Option 7) If two TRPs are connected to the same gNB or different gNBs, the gNB may calculate and report the UL-RTOA between TRPx and TRPy, and may calculate the time difference between Information 2 and Information 3 and report the time difference as one value to the LMF. For example, (Ta_x−Ta_y)+(Tb_x−Tb_y) may be reported as the time difference between the information 2 and the information 3.

Option 8) If two TRPs are connected to the same gNB or different gNBs, the gNB may calculate the time difference of information 2 and information 3 between TRPx and TRPy and report it to the LMF as one value. The one value corresponds to the time difference of the propagation delay from the TRP/GW/gNB to the satellite, for example, (RTOA_x−RTOA_y)−(Ta_x−Ta_y)−(Tb_x−Tb_y) may be reported.

In the above option 5) to option 8), when the transmission times in the two TRPs are exactly the same, (T_x−T_y)=0 is satisfied at the TRP/GW/gNB. Further, at the reference point, (T_x−T_y)+(Ta_x−Ta_y)=0 is satisfied. At the satellite, (T_x−T_y)+(Ta_x−Ta_y)+(Tb_x−Tb_y)=0 is satisfied.

The above operations allow the extension of UL-TDOA positioning in the TN to the NTN scenarios. In addition, the UE and the gNB may report necessary information to the LMF. In addition, when one value corresponding to a plurality of pieces of information (for example, information 1 to information 3) in a certain TRP is reported, or when one value corresponding to a plurality of pieces of information related to two TRPs of which a difference is reported is reported, signaling overhead can be reduced. In addition, when a plurality of pieces of information corresponding to a certain TRP are reported as a plurality of values, for example, when each piece of information is separately reported, or when a plurality of pieces of information related to two TRPs are reported as a plurality of values, for example, when information is reported for each TRP, calculation resources required for the gNB may be reduced, and different parts of information are clarified.

Figure 17:
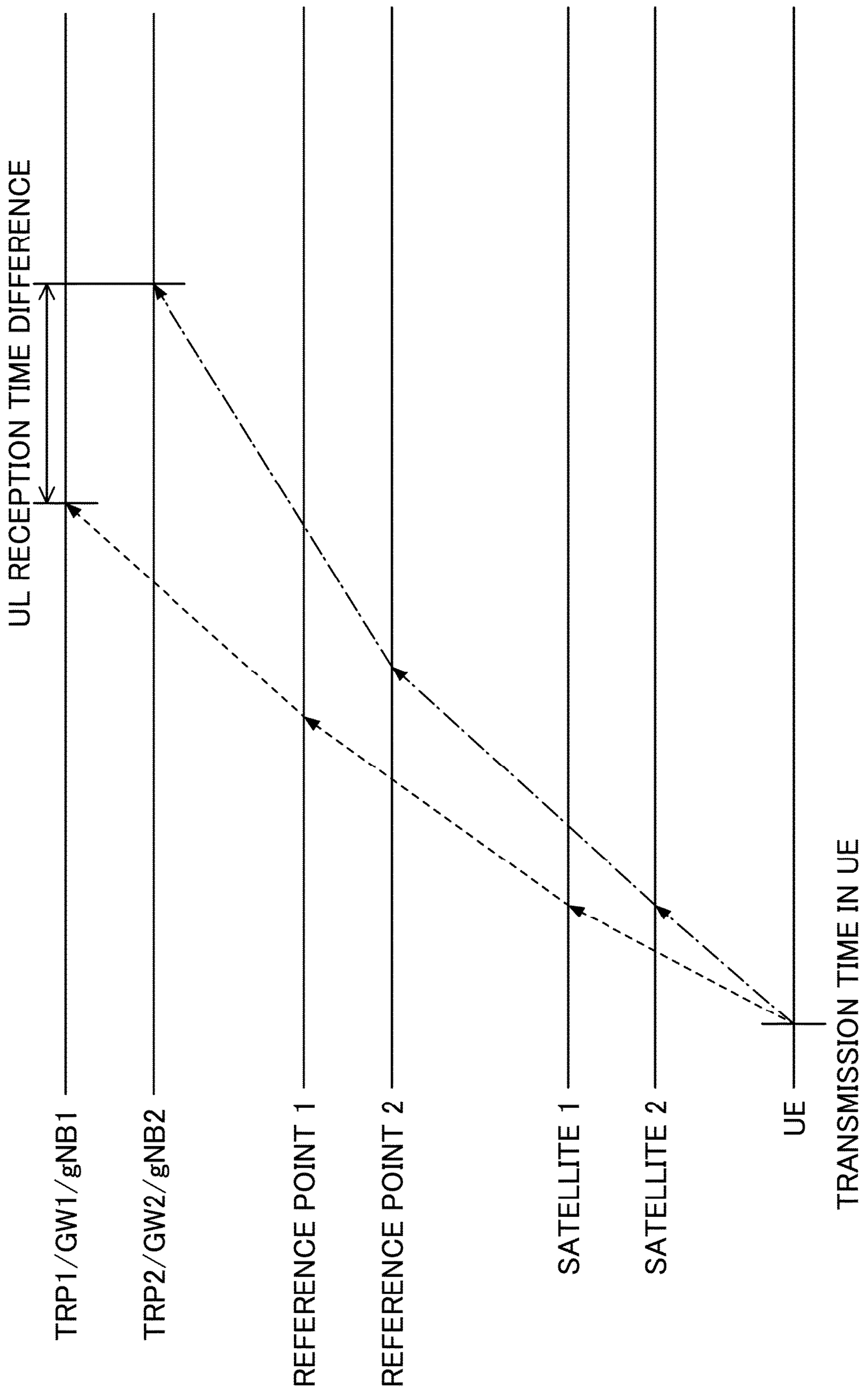
FIG. 17 is a diagram illustrating an example of a UL reception time difference in the embodiment of the present invention.

FIG. 17 is a diagram illustrating an example of the UL reception time difference in the embodiment of the present invention. As illustrated in FIG. 17, the propagation delay between the satellite and the UE for TRPx is denoted as Tc_x. Here, for TRPx and TRPy, RTOA_x−RTOA_y=(Ta_x−Ta_y)+(Tb_x−Tb_y)+(Tc_x−Tc_y). FIG. 17 is described for TRP1 and TRP2. LMF requires a value for Tc_x, e.g., (Tc_x−Tc_y), to calculate the UE location. Referring to FIG. 17, values reported to the LMF in the above option 1) to option 8) are described below.

Option 1) For each TRP, the gNB reports two values: RTOA_x and Ta_x+Tb_x.

Option 2) For each TRP, the gNB reports three values: RTOA_x, Ta_x, and Tb_x.

Option 3) For each TRP, the gNB reports one value: RTOA_x−Ta_x−Tb_x. The one value is Tc_x.

Option 4) For each TRP, the gNB reports two values: RTOA_x−Ta_x and Tb_x.

Option 5) If two TRPs are connected to the same gNB or different gNBs, the gNB reports three values: RTOA_x−RTOA_y, Ta_x−Ta_y, and Tb_x−Tb_y.

Option 6) If two TRPs are connected to the same gNB or different gNBs, the gNB reports two values: (RTOA_x−RTOA_y)−(Ta_x−Ta_y) and Tb_x−Tb_y.

Option 7) If two TRPs are connected to the same gNB or different gNBs, the gNB reports two values: RTOA_x−RTOA_y and (Ta_x−Ta_y)+(Tb_x−Tb_y).

Option 8) If two TRPs are connected to the same gNB or different gNBs, the gNB reports one value: (RTOA_x−RTOA_y)−(Ta_x−Ta_y)−(Tb_x−Tb_y). The one value is Tc_x−Tc_y.

It should be noted that the TRP/GW/gNB, the reference point, and the satellite may be a single point (i.e., the same geographical location) in the NTN. When the TRP/GW/gNB is the single point, Ta_x+Tb_x=0, and it is assumed that the TRP/GW/gNB is mounted on a satellite. Also, when Ta_x=0, the TRP/GW/gNB and the reference point are assumed to be a single point, and when Tb_x=0, the reference point and the satellite are assumed to be a single point.

Proposal 4) The UE may support reporting of the reception-transmission time difference to the GW/gNB/LMF via LPP. Note that, hereinafter, the TRP may be a satellite.

The UE may report the measured reception-transmission time difference from the TRP. Note that the information reported from the UE to the TRP/gNB/GW may be transferred to the LMF via the TRP/gNB/GW.

The gNB may also report timing information of information 1) to information 4) illustrated below to the LMF via the NRPPa.

Information 1) Reception-transmission time difference at the TRP controlled by the gNB or GW, measured by the gNB.

Information 2) RTT between the TRP controlled by the gNB or the GW and the satellite, which is calculated by the gNB. Further, the gNB may report assistance information for the LMF to calculate the propagation delay between the TRP controlled by the gNB or the GW and the satellite as information 2a to the LMF.

Information 3) RTT between a TRP controlled by the gNB or the GW and the reference point, calculated by the gNB. Further, the gNB may report assistance information for the LMF to calculate the propagation delay between the TRP controlled by the gNB or the GW and the reference point to the LMF as information 3a. The reference point may be a reference point defined in 3GPP Release 17. That is, the reference point serves as a reference of the DL timing and the UL timing. Alternatively, the reference point may be newly defined.

Information 4) RTT between the reference point and the satellite calculated by gNB. Further, the gNB may report assistance information for the LMF to calculate the propagation delay between the reference point and the satellite as information 4a to the LMF. The reference point may be a reference point defined in 3GPP Release 17. That is, the reference point serves as a reference of the DL timing and the UL timing. Alternatively, the reference point may be newly defined.

For the reporting of the information 1) to the information 4), option 1) to option 4) described below may be applied.

Option 1) gNB reception-transmission time difference and Information 2 (or Information 2a) may be reported separately.

Option 2) gNB reception-transmission time difference, Information 3 (or Information 3a), and Information 4 (or Information 4a) may be reported separately.

Option 3) The gNB may calculate the gNB reception-transmission time difference and the information 1 as one value and report the value to the LMF. For example, the reception-transmission time difference at the satellite may be reported with reference to a value obtained by subtracting a propagation delay between the TRP/GW/gNB and the satellite from the DL-PRS and UL-SRS reception time at the TRP/GW/gNB.

Option 4) The gNB may calculate the gNB reception-transmission time difference and the information 3 as one value and report the value to the LMF. For example, the reception-transmission time difference at the reference point may be reported with reference to a value obtained by subtracting a propagation delay between the TRP/GW/gNB and the reference point from the DL-PRS and UL-SRS reception time at the TRP/GW/gNB. Further, the gNB may additionally or separately report the information 4 to the LMF.

By the above operation, the positioning by multiple RTTs in a TN can be extended to an NTN scenario. In addition, the UE and the gNB may report necessary information to the LMF. In addition, when one value corresponding to a plurality of pieces of information (for example, information 1 to information 4) in a certain TRP is reported, or when one value corresponding to a plurality of pieces of information related to two TRPs of which a difference is reported is reported, signaling overhead can be reduced. In addition, when a plurality of pieces of information corresponding to a certain TRP are reported as a plurality of values, for example, when each piece of information is separately reported, or when a plurality of pieces of information related to two TRPs are reported as a plurality of values, for example, when information is reported for each TRP, calculation resources required for the gNB may be reduced, and different parts of information are clarified.

Figure 18:
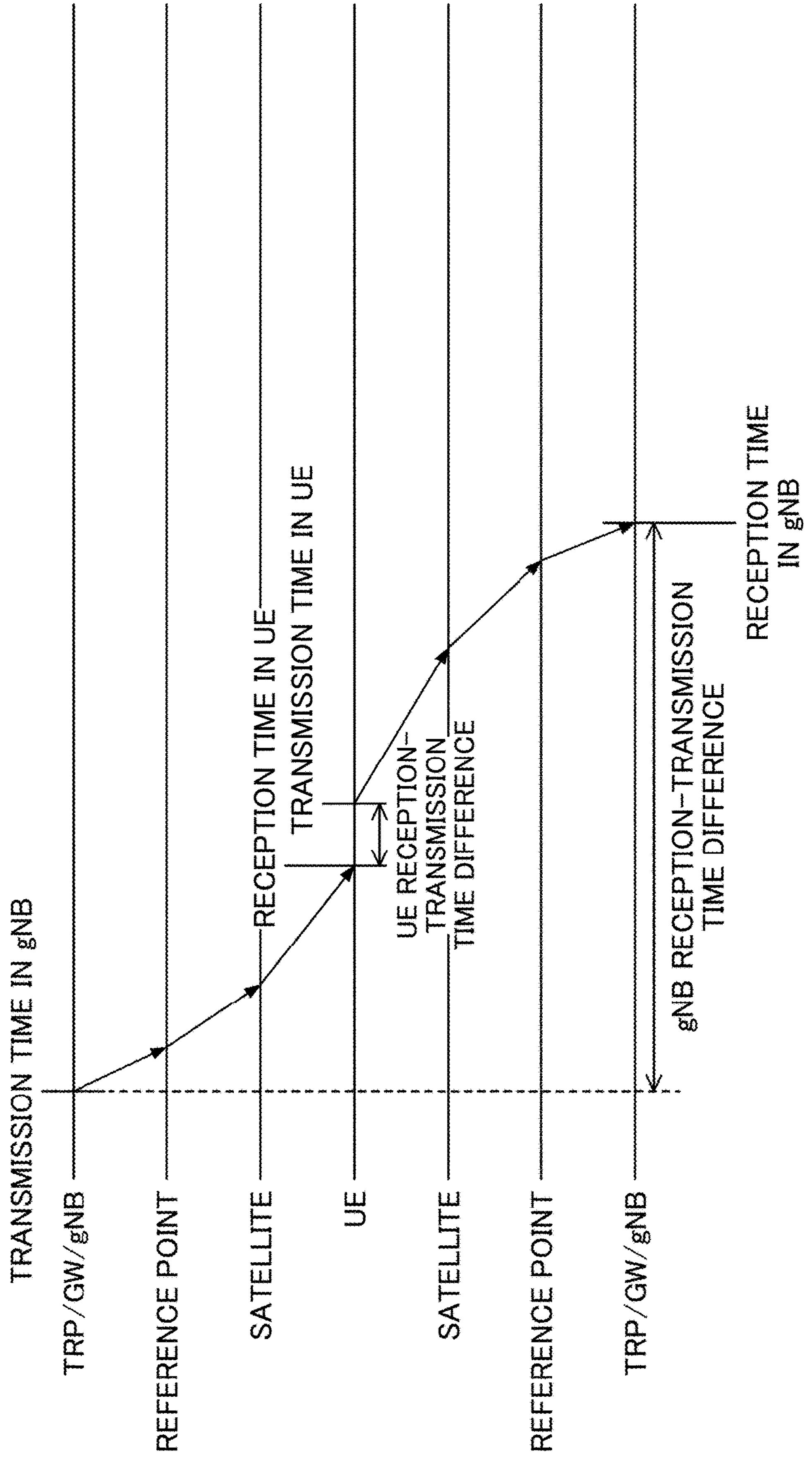
FIG. 18 is a diagram illustrating an example of RTT in the embodiment of the present invention.

FIG. 18 is a diagram illustrating an example of RTT in the embodiment of the present invention. In the RTT illustrated in FIG. 18, the following information (a) to (f) can be defined.

(a) UE reception-transmission time difference
(b) TRP/GW/gNB reception-transmission time difference
(c) RTT between TRP/GW/gNB and satellite
(d) RTT between TRP/GW/gNB and reference point
(e) RTT between the reference point and the satellite.
(f) RTT between the satellite and the UE.

Note that (f) is necessary for the LMF to perform the positioning of the UE.

Among the above pieces of information, information measured by the UE is (a). Among the above pieces of information, information reported by the UE is (a). Among the above pieces of information, information measured by the gNB is (b), and the gNB may measure the reception times of the DL-PRS and the UL-PRS at the TRP/GW/gNB. Among the above pieces of information, information calculated by the gNB includes (c), (d), (e), and (c)+(d).

Among the above pieces of information, pieces of information reported by the gNB to the LMF are (b) and (c) in the option 1; (b), (d), and (e) in the option 2; (b)-(c) in the option 3; and (b)-(d), and (e) in the option 4.

In the above embodiments, the satellites may be replaced by non-terrestrial communication devices including satellites and HAPS, etc.

Through the above embodiment, in the NTN environment, the gNB and the UE report the information required for positioning the UE to the LMF, and the LMF may perform positioning of the UE according to the information.

That is, the positioning of the terminal can be performed in the network system.

(Device Configuration)

Next, functional configuration examples of the base station 10 and the terminal 20 that execute the processes and operations described above will be described. The base station 10 and the terminal 20 include functions for implementing the above-described embodiments. However, each of the base station 10 and the terminal 20 may include only a part of the functions in the embodiments.

<Base Station 10>

Figure 19:
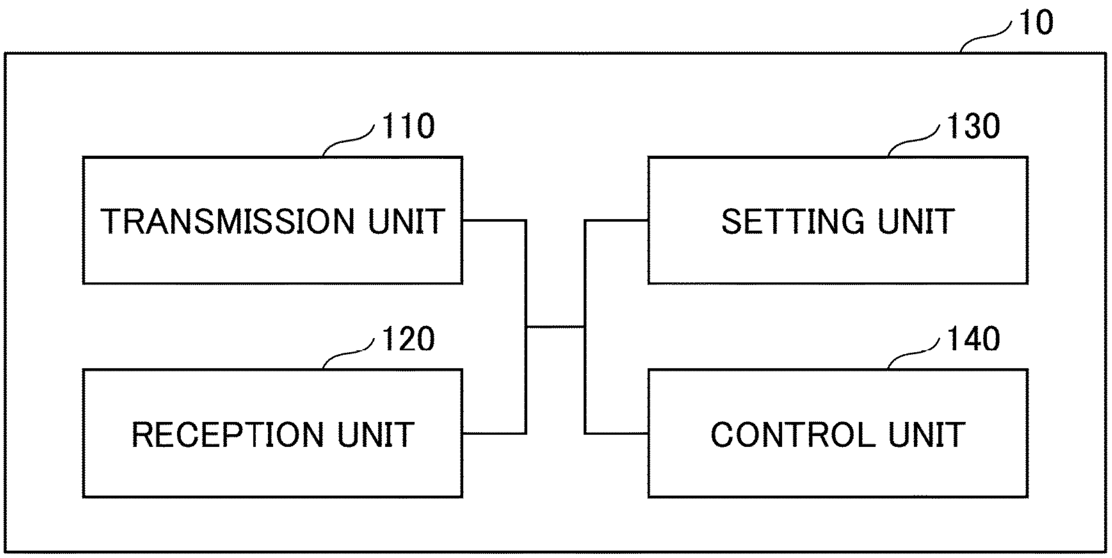
FIG. 19 is a diagram illustrating an example of a functional configuration of a base station 10 according to the embodiment of the present invention.

FIG. 19 is a diagram illustrating an example of a functional configuration of the base station 10 according to the embodiment of the present invention. As illustrated in FIG. 19, the base station 10 includes a transmission unit 110, a reception unit 120, a setting unit 130, and a control unit 140. The functional configuration illustrated in FIG. 19 is merely an example. Names of the functional sections and the functional units may be any names as long as the operations according to the embodiment of the present invention can be executed. Further, the network node such as the LMF may have the same configuration as the base station 10.

The transmission unit 110 includes a function of generating a signal to be transmitted to the terminal 20 side and wirelessly transmitting the signal. The transmission unit 110 transmits the inter-network-node message to another network node. The reception unit 120 includes a function of receiving various signals transmitted from the terminal 20 and acquiring, for example, information on a higher layer from the received signal. The transmission unit 110 has a function of transmitting the NR-PSS, the NR-SSS, the NR-PBCH, the DL/UL control signal, and the like to the terminal 20. The reception unit 120 receives an inter-network-node message from another network node.

The setting unit 130 stores setting information set in advance and various kinds of setting information to be transmitted to the terminal 20. The content of the setting information is, for example, information related to communication in the NTN.

The control unit 140 performs control related to communication in the NTN as described in the embodiment. The control unit 140 controls communication with the terminal 20 based on the UE capability report regarding the radio parameters received from the terminal 20. The functional unit related to signal transmission in the control unit 140 may be included in the transmission unit 110, and the functional unit related to signal reception in the control unit 140 may be included in the reception unit 120.

<Terminal 20>

Figure 20:
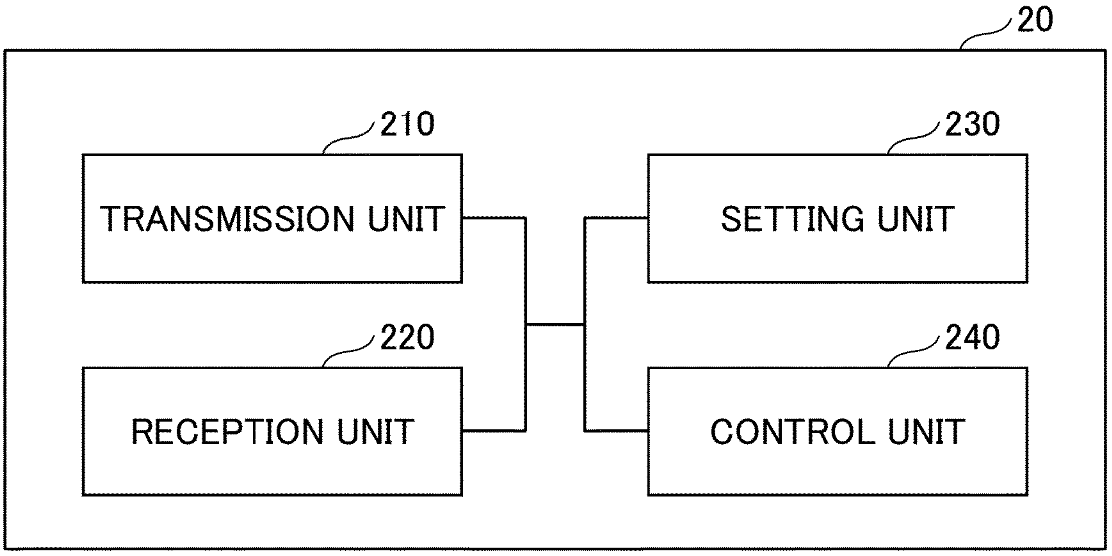
FIG. 20 is a diagram illustrating an example of a functional configuration of a terminal 20 according to the embodiment of the present invention.

FIG. 20 is a diagram illustrating an example of a functional configuration of the terminal 20 according to the embodiment of the present invention. As illustrated in FIG. 20, the terminal 20 includes a transmission unit 210, a reception unit 220, a setting unit 230, and a control unit 240. The functional configuration illustrated in FIG. 20 is merely an example. The functional sections and the names of the functional units may be any as long as the operations according to the embodiment of the present invention can be executed.

The transmission unit 210 creates a transmission signal from the transmission data and wirelessly transmits the transmission signal. The reception unit 220 wirelessly receives various signals and acquires a signal of a higher layer from the received signal of the physical layer. Also, the reception unit 220 has a function of receiving the NR-PSS, NR-SSS, NR-PBCH, DL/UL/SL control signals and so forth transmitted from the base station 10. For example, the transmission unit 210 transmits a physical sidelink control channel (PSCCH), a physical sidelink shared channel (PSSCH), a physical sidelink discovery channel (PSDCH), a physical sidelink broadcast channel (PSBCH), or the like to other terminals 20 as the D2D communication, and the reception unit 120 receives the PSCCH, the PSSCH, the PSDCH, the PSBCH, or the like from the other terminals 20.

The setting unit 230 stores various types of setting information received from the base station 10 by the reception unit 220. The setting unit 230 also stores setting information set in advance. The content of the setting information is, for example, information related to communication in the NTN.

The control unit 240 performs control related to communication in the NTN as described in the embodiment. The functional unit related to signal transmission in the control unit 240 may be included in the transmission unit 210, and the functional unit related to signal reception in the control unit 240 may be included in the reception unit 220.

(Hardware Configuration)

The block diagrams (FIGS. 19 and 20) used for the description of the above embodiment illustrate blocks in functional units. These functional blocks (constituent units) are implemented by any combination of at least one of hardware and software. The method of realizing each functional block is not particularly limited. That is, each functional block may be implemented by using one device that is physically or logically coupled, or may be implemented by using two or more devices that are physically or logically separated and are directly or indirectly (for example, using a wired or wireless connection) connected to each other. The functional blocks may be implemented by combining software with the one device or the plurality of devices.

Functions include, but are not limited to, judging, determining, deciding, calculating, computing, processing, deriving, investigating, searching, ascertaining, receiving, sending, outputting, accessing, resolving, selecting, choosing, establishing, comparing, assuming, expecting, considering, broadcasting, notifying, communicating, forwarding, configuring, reconfiguring, allocating, mapping, assigning, and the like. For example, a functional block (component) that causes transmission to function is referred to as a transmission unit or a transmitter. In any case, as described above, the method of realization is not particularly limited.

Figure 21:
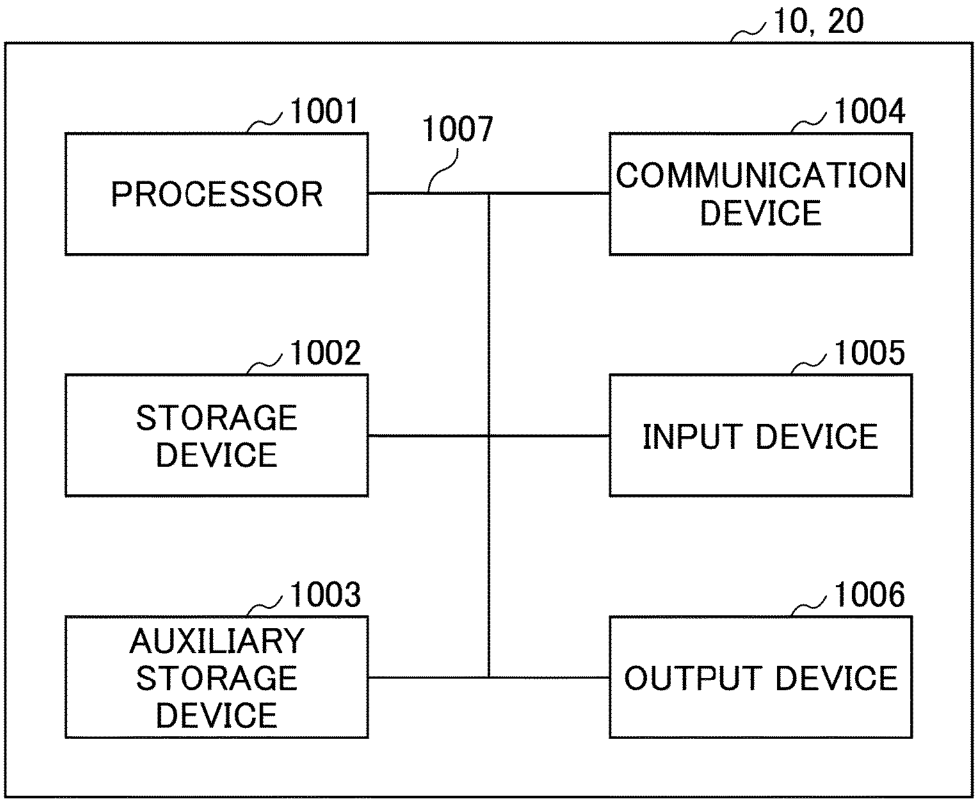
FIG. 21 is a diagram illustrating an example of a hardware configuration of the base station 10 or the terminal 20 according to the embodiment of the present invention.

For example, the base station 10, the terminal 20, and the like according to an embodiment of the present disclosure may function as a computer that performs the process of the wireless communication method of the present disclosure. FIG. 21 is a diagram illustrating an example of a hardware configuration of the base station 10 and the terminal according to an embodiment of the present disclosure. The base station 10 and the terminal 20 described above may be physically configured as a computer device including a processor 1001, a storage device 1002, an auxiliary storage device 1003, a communication device 1004, an input device 1005, an output device 1006, a bus 1007, and the like.

In the following description, the term “apparatus” can be replaced with a circuit, a device, a unit, or the like. The hardware configuration of the base station 10 and the terminal 20 may be configured to include one or more of the devices illustrated in the drawing, or may be configured without including some of the devices.

Each function in the base station 10 and the terminal 20 is implemented by causing hardware such as the processor 1001 and the storage device 1002 to read predetermined software (program), and thereby causing the processor 1001 to perform calculation, control communication by the communication device 1004, and control at least one of reading and writing of data in the storage device 1002 and the auxiliary storage device 1003.

The processor 1001 controls the entire computer by operating an operating system, for example. The processor 1001 may be configured by a central processing unit (CPU) including an interface with a peripheral device, a control device, an arithmetic device, a register, and the like. For example, the control unit 140, the control unit 240, and the like described above may be implemented by the processor 1001.

The processor 1001 reads a program (program code), a software module, data, or the like from at least one of the auxiliary storage device 1003 and the communication device 1004 to the storage device 1002, and executes various processes according to the program, the software module, the data, or the like. As the program, a program that causes a computer to execute at least a part of the operations described in the above-described embodiments is used. For example, the control unit 140 of the base station 10 illustrated in FIG. 19 may be implemented by a control program that is stored in the storage device 1002 and operates on the processor 1001. For example, the control unit 240 of the terminal 20 illustrated in FIG. 20 may be implemented by a control program that is stored in the storage device 1002 and operates on the processor 1001. Although the various processes described above are executed by one processor 1001, the processes may be executed simultaneously or sequentially by two or more processors 1001. The processor 1001 may be implemented by one or more chips. The program may be transmitted from a network via an electric communication line.

The storage device 1002 is a computer-readable recording medium, and may be configured by at least one of a read only memory (ROM), an erasable programmable ROM (EPROM), an electrically erasable programmable ROM (EEPROM), a random access memory (RAM), and the like. The storage device 1002 may be referred to as a register, a cache, a main memory (main storage device), or the like. The storage device 1002 can store a program (program code), a software module, and the like that can be executed to implement the communication method according to an embodiment of the present disclosure.

The auxiliary storage device 1003 is a computer-readable recording medium, and may be configured by at least one of an optical disc such as a CD-ROM (Compact Disc ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. The storage medium may be, for example, a database, a server, or another appropriate medium including at least one of the storage device 1002 and the auxiliary storage device 1003.

The communication device 1004 is hardware (a transmission/reception device) for performing communication between computers via at least one of a wired network and a wireless network, and is also referred to as, for example, a network device, a network controller, a network card, a communication module, or the like. The communication device 1004 may include a high-frequency switch, a duplexer, a filter, a frequency synthesizer, and the like in order to realize at least one of frequency division duplex (FDD) and time division duplex (TDD), for example. For example, the transmission/reception antenna, the amplifier unit, the transmission/reception unit, the transmission path interface, and the like may be implemented by the communication device 1004. The transmission/reception unit may be implemented as a transmission unit and a reception unit that are physically or logically separated.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs output to the outside. The input device 1005 and the output device 1006 may be integrated (for example, a touch panel).

The devices such as the processor 1001 and the storage device 1002 are connected to each other by a bus 1007 for communicating information. The bus 1007 may be configured using a single bus or may be configured using different buses for the respective devices.

The base station 10 and the terminal 20 may be configured to include hardware such as a microprocessor, a digital signal processor (DSP), an application specific integrated circuit (ASIC), a programmable logic device (PLD), or a field programmable gate array (FPGA), and some or all of the functional blocks may be implemented by the hardware. For example, the processor 1001 may be implemented using at least one of these hardware.

Figure 22:
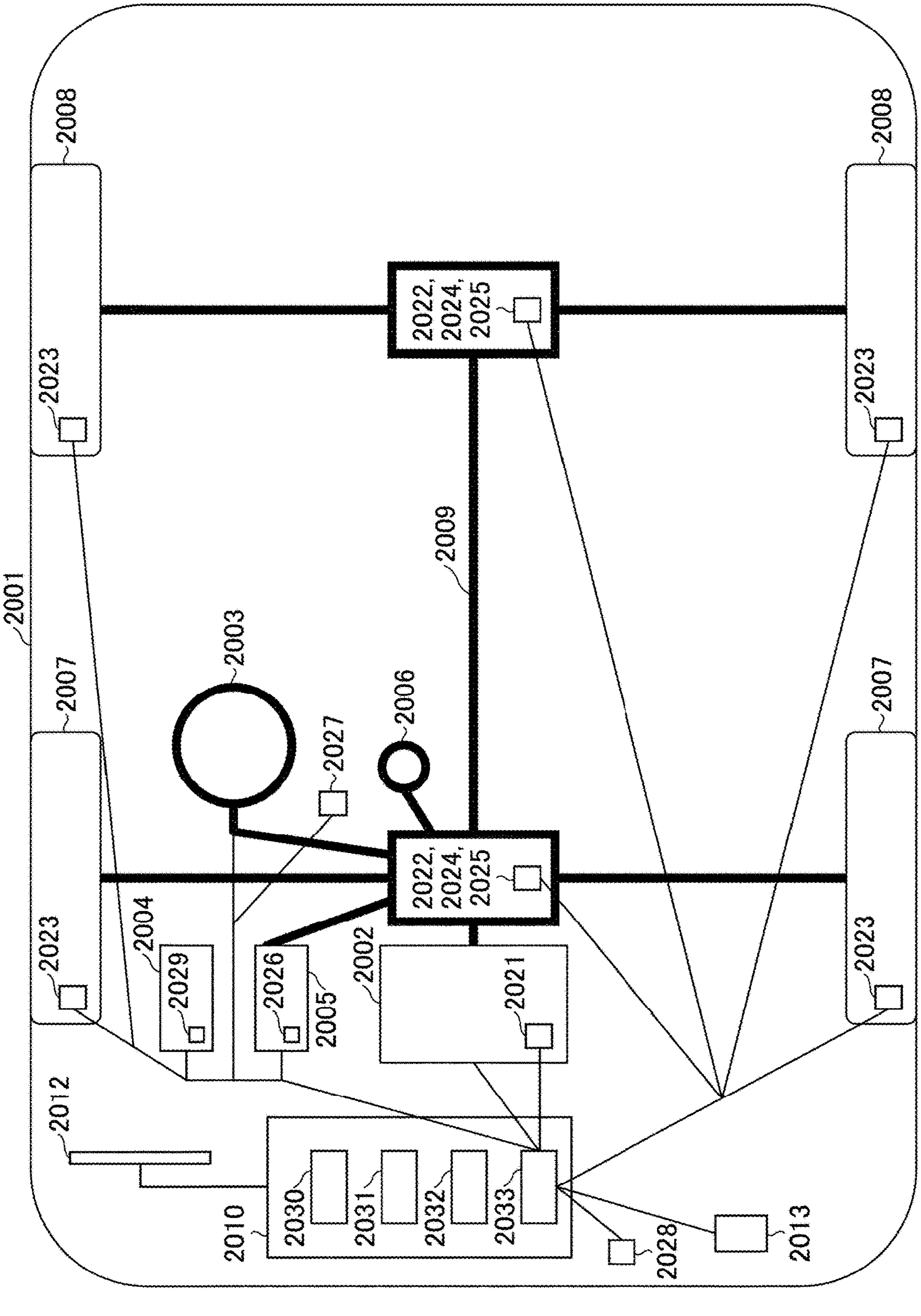
FIG. 22 is a diagram illustrating an example of a configuration of a vehicle 2001 according to the embodiment of the present invention.

FIG. 22 illustrates a configuration example of the vehicle 2001. As illustrated in FIG. 22, the vehicle 2001 includes a drive unit 2002, a steering unit 2003, an accelerator pedal 2004, a brake pedal 2005, a shift lever 2006, front wheels 2007, rear wheels 2008, axles 2009, an electronic control unit 2010, various sensors 2021 to 2029, an information service unit 2012, and a communication module 2013. Each aspect/embodiment described in the present disclosure may be applied to a communication device mounted on the vehicle 2001, and may be applied to, for example, the communication module 2013.

The drive unit 2002 is configured by, for example, an engine, a motor, or a hybrid of an engine and a motor. The steering unit 2003 includes at least a steering wheel (also referred to as a handle), and is configured to steer at least one of the front wheel and the rear wheel based on an operation of the steering wheel operated by the user.

The electronic control unit 2010 includes a microprocessor 2031, memories (ROM and RAM) 2032, and a communication port (IO port) 2033. Signals from various sensors 2021 to 2029 provided in the vehicle 2001 are input to the electronic control unit 2010. The electronic control unit 2010 may be referred to as an electronic control unit (ECU).

The signals from the various sensors 2021 to 2029 include a current signal from a current sensor 2021 that senses a current of the motor, a rotation speed signal of the front wheel or the rear wheel acquired by a rotation speed sensor 2022, an air pressure signal of the front wheel or the rear wheel acquired by an air pressure sensor 2023, a vehicle speed signal acquired by a vehicle speed sensor 2024, an acceleration signal acquired by an acceleration sensor 2025, a depression amount signal of an accelerator pedal acquired by an accelerator pedal sensor 2029, a depression amount signal of a brake pedal acquired by a brake pedal sensor 2026, an operation signal of a shift lever acquired by a shift lever sensor 2027, and a detection signal for detecting an obstacle, a vehicle, a pedestrian, or the like acquired by an object detection sensor 2028.

The information service unit 2012 includes various devices for providing various information such as driving information, traffic information, and entertainment information, such as a car navigation system, an audio system, a speaker, a television, and a radio, and one or more ECUs for controlling these devices. The information service unit 2012 provides various multimedia information and multimedia services to the occupant of the vehicle 2001 using information acquired from an external device via the communication module 2013 or the like.

The driving support system unit 2030 includes various devices for providing functions for preventing accidents and reducing the driving load of the driver, such as a millimeter wave radar, a light detection and ranging (LiDAR), a camera, a positioning locator (for example, GNSS), map information (for example, a high definition (HD) map and an automatic driving vehicle (AV) map), a gyro system (for example, an inertial measurement unit (IMU) and an inertial navigation system (INS)), an artificial intelligence (AI) chip, and an AI processor, and one or more ECUs for controlling these devices. The driving support system unit 2030 transmits and receives various kinds of information via the communication module 2013 and realizes a driving support function or an automatic driving function.

The communication module 2013 may communicate with the microprocessor 2031 and components of the vehicle 2001 via the communication port. For example, the communication module 2013 transmits and receives data to and from the drive unit 2002, the steering unit 2003, the accelerator pedal 2004, the brake pedal 2005, the shift lever 2006, the front wheels 2007, the rear wheels 2008, the axle 2009, the microprocessor 2031 and the memories (ROM, RAM) 2032 in the electronic control unit 2010, and the sensors 2021 to 29 provided in the vehicle 2001 via the communication port 2033.

The communication module 2013 is a communication device that can be controlled by the microprocessor 2031 of the electronic control unit 2010 and can communicate with an external device. For example, the MFP transmits and receives various kinds of information to and from an external apparatus via wireless communication. The communication module 2013 may be internal or external to the electronic control unit 2010. The external device may be, for example, a base station, a mobile station, or the like.

The communication module 2013 transmits the current signal from the current sensor, which is input to the electronic control unit 2010, to an external device via wireless communication. The communication module 2013 also transmits the rotation speed signals of the front and rear wheels acquired by the rotation speed sensor 2022, the air pressure signals of the front and rear wheels acquired by the air pressure sensor 2023, the vehicle speed signals acquired by the vehicle speed sensor 2024, the acceleration signals acquired by the acceleration sensor 2025, the depression amount signals of the accelerator pedal acquired by the accelerator pedal sensor 2029, the depression amount signals of the brake pedal acquired by the brake pedal sensor 2026, the operation signals of the shift lever acquired by the shift lever sensor 2027, and the detection signals for detecting obstacles, vehicles, pedestrians, and the like acquired by the object detection sensor 2028, which are input to the electronic control unit 2010, to the external device via wireless communication.

The communication module 2013 receives various kinds of information (traffic information, signal information, intervehicle information, and the like) transmitted from an external device, and displays the information on the information service unit 2012 provided in the vehicle 2001. The communication module 2013 stores various kinds of information received from the external device in the memory 2032 that can be used by the microprocessor 2031. The microprocessor 2031 may control the drive unit 2002, the steering unit 2003, the accelerator pedal 2004, the brake pedal 2005, the shift lever 2006, the front wheel 2007, the rear wheel 2008, the axle 2009, the sensors 2021 to 2029, and the like provided in the vehicle 2001 based on the information stored in the memory 2032.

Summary of Embodiments

As described above, according to the embodiments of the present invention, a base station in a network system is provided. The base station includes a reception unit configured to receive a first reference signal from a terminal via a first non-terrestrial communication device; and a transmission unit configured to transmit, to a location management function (LMF), information related to a propagation delay of the first reference signal and information related to a reception timing of the first reference signal.

With the above configuration, in the NTN environment, the gNB and the UE report information required for positioning the UE to the LMF, and the LMF can perform positioning of the UE based on the information. That is, the positioning of the terminal can be performed in the network system.

The transmission unit may transmit, to the LMF, a relative time of arrival (RTOA) of the first reference signal and a propagation delay of the first reference signal between the base station and the first non-terrestrial communication device. With this configuration, in the NTN environment, the gNB and the UE report information required for positioning the UE to the LMF, and the LMF can perform positioning of the UE based on the information.

The transmission unit may transmit, to the LMF, a value obtained by subtracting a propagation delay of the first reference signal between the base station and the first non-terrestrial communication device from a relative time of arrival (RTOA) of the first reference signal. With this configuration, in the NTN environment, the gNB and the UE report information required for positioning the UE to the LMF, and the LMF can perform positioning of the UE based on the information.

The transmission unit may transmit, to the LMF, a difference between a relative time of arrival (RTOA) of the first reference signal and an RTOA of a second reference signal transmitted from the terminal via a second non-terrestrial communication device, a difference between a propagation delay of the first reference signal between the base station and a first reference point and a propagation delay of the second reference signal between the base station and a second reference point, and a difference between a propagation delay of the first reference signal between the first reference point and the first non-terrestrial communication device and a propagation delay of the second reference signal between the second reference point and the second non-terrestrial communication device. With this configuration, in the NTN environment, the gNB and the UE report information required for positioning the UE to the LMF, and the LMF can perform positioning of the UE based on the information.

The transmission unit may transmit, to the LMF, a value obtained by subtracting a difference between a propagation delay of a first reference signal between the base station and a first reference point and a propagation delay of a second reference signal between the base station and a second reference point and a difference between a propagation delay of the first reference signal between the first reference point and a first non-terrestrial communication device and a propagation delay of the second reference signal between the second reference point and a second non-terrestrial communication device from a difference between a relative time of arrival (RTOA) of the first reference signal and an RTOA of the second reference signal transmitted from the terminal via the second non-terrestrial communication device. With this configuration, in the NTN environment, the gNB and the UE report information required for positioning the UE to the LMF, and the LMF can perform positioning of the UE based on the information.

According to an embodiment of the present invention, a communication method executed by a base station in a network system is provided. The communication method includes a reception procedure of receiving a first reference signal from a terminal via a first non-terrestrial communication device; and a transmission procedure of transmitting, to a location management function (LMF), information related to a propagation delay of the first reference signal and information related to a reception timing of the first reference signal.

With the above configuration, in the NTN environment, the gNB and the UE report the information required for positioning the UE to the LMF, and the LMF can perform positioning of the UE based on the information. That is, the positioning of the terminal can be performed in the network system.

Supplement of Embodiment

Although the embodiments of the present invention have been described above, the disclosed invention is not limited to such embodiments, and a person skilled in the art will understand various modifications, corrections, alternatives, substitutions, and the like. Although the description has been made using specific numerical examples to facilitate understanding of the invention, these numerical values are merely examples and any appropriate values may be used unless otherwise specified. The classification of the items in the above description is not essential to the present invention, and matters described in two or more items may be used in combination as necessary, and matters described in a certain item may be applied to matters described in another item (as long as there is no contradiction). The boundaries of functional units or processing units in the functional block diagrams do not necessarily correspond to the boundaries of physical components. The operations of a plurality of functional units may be physically performed by one component, or the operation of one functional unit may be physically performed by a plurality of components. The order of the processing procedures described in the embodiment may be changed as long as there is no contradiction. For convenience of description of the processing, the base station 10 and the terminal 20 have been described using functional block diagrams, but such devices may be implemented by hardware, software, or a combination thereof. Software executed by a processor of the base station 10 according to an embodiment of the present invention and software executed by a processor of the terminal 20 according to an embodiment of the present invention may be stored in any appropriate storage medium such as a random access memory (RAM), a flash memory, a read-only memory (ROM), an EPROM, an EEPROM, a register, a hard disk (HDD), a removable disk, a CD-ROM, a database, a server, or the like.

In addition, the notification of information is not limited to the aspect/embodiment described in the present disclosure, and may be performed using other methods. For example, the notification of information may be performed by physical layer signaling (for example, downlink control information (DCI) and uplink control information (UCI)), higher layer signaling (for example, radio resource control (RRC) signaling and medium access control (MAC) signaling), broadcast information (master information block (MIB) and system information block (SIB)), other signals, or a combination thereof. The RRC signaling may be referred to as an RRC message, and may be, for example, an RRC connection setup message, an RRC connection reconfiguration message, or the like.

Aspects/embodiments described herein may be applied to systems using Long Term Evolution (LTE), LTE-Advanced (LTE-A), SUPER 3G, IMT-Advanced, 4G (4th generation mobile communication system), 5G (5th generation mobile communication system), 6th generation mobile communication system (6G), xth generation mobile communication system (xG), FRA (Future Radio Access), NR (new Radio), New radio access (NX), Future generation radio access (FX), W-CDMA (registered trademark), GSM (registered trademark), CDMA2000, UMB (Ultra Mobile Broadband), IEEE 802.11 (Wi-Fi (registered trademark)), IEEE 802.16 (WiMAX), IEEE 802.20, UWB (Ultra-WideBand), Bluetooth (registered trademark), and/or other suitable systems and/or future generation systems that have been extended, modified, created, or defined based thereon. In addition, combination of a plurality of systems may be applied (for example a combination of at least one of LTE and LTE-A and 5G).

The order of the processing procedures, sequences, flowcharts, and the like of the respective aspects/embodiments described in the present specification may be changed as long as there is no contradiction. For example, for the methods described in this disclosure, the elements of the various steps are presented using an exemplary order and are not limited to the specific order presented.

In this specification, a specific operation described as being performed by the base station 10 may be performed by an upper node of the base station 10 in some cases. It will be apparent that, in a network including one or more network nodes including the base station 10, various operations performed for communication with the terminal 20 may be performed by at least one of the base station 10 and network nodes (for example, an MME or an S-GW, but not limited thereto) other than the base station 10. Although the case where the number of network nodes other than the base station 10 is one has been exemplified above, the other network nodes may be a combination of a plurality of other network nodes (for example, an MME and an S-GW).

The information, signals, or the like described in the present disclosure may be output from an upper layer (or a lower layer) to a lower layer (or an upper layer). The input and output may be performed via a plurality of network nodes.

The input/output information and the like may be stored in a specific location (for example, a memory) or may be managed using a management table. The information or the like to be input and output can be overwritten, updated, or added. The output information and the like may be deleted. The input information and the like may be transmitted to another apparatus.

The determination in the present disclosure may be performed by a value (0 or 1) represented by one bit, may be performed by a Boolean value (true or false), or may be performed by comparison of numerical values (for example, comparison with a predetermined value).

Software shall be construed broadly to mean instructions, instruction sets, code, code segments, program code, programs, subprograms, software modules, applications, software applications, software packages, routines, subroutines, objects, executable files, threads of execution, procedures, functions, etc., whether referred to as software, firmware, middleware, microcode, hardware description language, or otherwise.

Software, instructions, information, and the like may also be transmitted or received over a transmission medium. For example, when the software is transmitted from a website, server, or other remote source using wired (e.g., coaxial cable, fiber optic cable, twisted pair, digital subscriber line (DSL), etc.) and/or wireless (e.g., infrared, microwave, etc.) technologies, then those wired and/or wireless technologies are included within the definition of transmission medium.

Information, signals, etc. described in this disclosure may be represented using any of a variety of different technologies. For example, data, instructions, commands, information, signals, bits, symbols, chips, and the like that may be referenced throughout the above description may be represented by voltages, currents, electromagnetic waves, magnetic fields or particles, optical fields or particles, or any combination thereof.

The terms described in the present disclosure and the terms necessary for understanding the present disclosure may be replaced with terms having the same or similar meanings. For example, at least one of the channel and the symbol may be a signal (signaling). The signal may also be a message. Also, a component carrier (CC) may be referred to as a carrier frequency, a cell, a frequency carrier and so forth.

As used in this disclosure, the terms “system” and “network” are used interchangeably.

In addition, the information, parameters, and the like described in the present disclosure may be represented using absolute values, may be represented using relative values from predetermined values, or may be represented using other corresponding information. For example, the radio resource may be indicated by an index.

The names used for the parameters described above are not in any way limiting. Further, the mathematical expressions, etc., that use these parameters may differ from those explicitly disclosed in this disclosure. The various names assigned to the various channels (e.g., PUCCH, PDCCH, etc.) and information elements are not limiting in any way, as these various channels and information elements may be identified by any suitable names.

In the present disclosure, the terms “base station (BS)”, “radio base station”, “base station apparatus”, “fixed station”, “NodeB”, “eNodeB (eNB)”, “gNodeB (gNB)”, “access point”, “transmission point”, “reception point”, “transmission/reception point”, “cell”, “sector”, “cell group”, “carrier”, “component carrier”, and the like may be used interchangeably. A base station may also be referred to by terms such as macro cell, small cell, femto cell, pico cell, etc.

The base station can accommodate one or a plurality of (for example, three) cells. When the base station accommodates multiple cells, the overall coverage area of the base station may be partitioned into multiple smaller areas, and each smaller area may provide communication services through a base station subsystem (e.g., indoor Remote Radio Head (RRH)). The term “cell” or “sector” refers to a portion or the entirety of the coverage area of a base station and/or a base station subsystem providing communication services in this coverage.

In the present disclosure, the terms “Mobile Station (MS)”, “user terminal”, “User Equipment (UE)”, “terminal”, and the like may be used interchangeably.

A mobile station may also be referred to by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology.

At least one of the base station and the mobile station may be referred to as a transmission device, a reception device, a communication device, or the like. At least one of the base station and the mobile station may be a device mounted on a mobile object, the mobile object itself, or the like. The moving object may be a vehicle (for example, a car, an airplane, or the like), a moving object that moves without a person (for example, a drone, an automatically driven vehicle, or the like), or a robot (manned or unmanned). At least one of the base station and the mobile station includes a device that does not necessarily move during the communication operation. For example, at least one of the base station and the mobile station may be an IoT (Internet of Things) sensor or the like. The device may be a device.

Also, the base station in the present disclosure may be read as a user terminal. For example, each aspect/embodiment of the present disclosure may be applied to a configuration in which communication between base stations and user terminals is replaced with communication between a plurality of terminals 20 (which may be referred to as, for example, device-to-device (D2D), vehicle-to-everything (V2X), or the like). In this case, the terminal 20 may have the functions of the base station 10. In addition, the wording such as "uplink" and "downlink" may be replaced with wording corresponding to the inter-terminal communication (for example, "side"). For example, the uplink channel, the downlink channel, and the like may be replaced with the side channel.

Similarly, the user terminal in the present disclosure may be replaced with a base station. In this case, the base station may have the functions of the user terminal described above.

As used in this disclosure, the terms "determining" and "determining" may encompass a wide variety of actions. The "determination" and "decision" may include, for example, judging, calculating, computing, processing, deriving, investigating, looking up, searching, and inquiring (for example, searching in a table, a database, or another data structure), and assuming that confirming is performed. Also, "determining" and "deciding" may include regarding receiving (for example, receiving information), transmitting (for example, transmitting information), inputting, outputting, and accessing (for example, accessing data in a memory) as "determining" and "deciding". In addition, "determining" and "deciding" may include regarding that "resolving", "selecting", "choosing", "establishing", "comparing", and the like are performed as "determining" and "deciding". That is, "determination" and "decision" may include regarding some operation as "determination" and "decision". In addition, "determination" may be replaced with "assuming", "expecting", "considering", or the like.

The terms "connected," "coupled," or any variant thereof, mean any connection or coupling, direct or indirect, between two or more elements, and may include the presence of one or more intermediate elements between two elements that are "connected" or "coupled" together. The coupling or connection between the elements may be physical, logical, or a combination thereof. For example, "connection" may be replaced with "access". As used in this disclosure, two elements may be considered to be "connected" or "coupled" to each other using one or more electrical wires, cables, and/or printed electrical connections, as well as using electromagnetic energy having wavelengths in the radio frequency range, microwave range, and optical (both visible and invisible) range, as some non-limiting and non-exhaustive examples.

The reference signal may be abbreviated as an RS and may be referred to as a pilot according to an applied standard.

As used in this disclosure, the phrase "based on" does not mean "based only on," unless expressly specified otherwise. In other words, the phrase "based on" means both "based only on" and "based at least on".

Any reference to an element herein using a designation such as "first," "second," and so forth does not generally limit the quantity or order of those elements. These designations may be used in this disclosure as a convenient method of distinguishing between two or more elements. Thus, a reference to first and second elements does not mean that only two elements may be employed, or that the first element must precede the second element in some manner.

The "means" in the configuration of each device described above may be replaced with a "unit", a "circuit", a "device", or the like.

When the terms "include", "including" and variations thereof are used in this disclosure, these terms are intended to be inclusive in a manner similar to the term "comprising". Furthermore, the term "or" as used in this disclosure is not intended to be an exclusive OR.

The radio frame may be composed of one or more frames in the time domain. In the time domain, one or more frames may be referred to as a subframe. The subframe may further be constituted by one or more slots in the time domain. The subframe may have a fixed time length (for example, 1 ms) that does not depend on numerology.

The numerology may be a communication parameter applied to the transmission and/or reception of a signal or channel. The numerology may indicate, for example, at least one of a SubCarrier Spacing (SCS), a bandwidth, a symbol length, a cyclic prefix length, a Transmission Time Interval (TTI), a number of symbols per TTI, a radio frame configuration, a particular filtering process performed by the transceiver in the frequency domain, a particular windowing process performed by the transceiver in the time domain, etc.

A slot may include one or more symbols (orthogonal frequency division multiplexing (OFDM) symbols) in the time domain. The symbol may be configured by a symbol, a single carrier frequency division multiple access (SC-FDMA) symbol, or the like. The slot may be a time unit based on a numerology.

The slot may include a plurality of mini-slots. Each mini-slot may be composed of one or more symbols in the time domain. The mini-slot may also be referred to as a sub-slot. A mini-slot may be composed of a smaller number of symbols than a slot. A PDSCH (or PUSCH) transmitted in a time unit larger than a mini-slot may be referred to as PDSCH (or PUSCH) mapping type A. The PDSCH (or PUSCH) transmitted using the mini-slot may be referred to as PDSCH (or PUSCH) mapping type B.

The radio frame, the subframe, the slot, the mini-slot and the symbol all represent a time unit for transmitting a signal. The radio frame, the subframe, the slot, the mini-slot, and the symbol may be referred to as different names corresponding to each other.

For example, one subframe may be referred to as a transmission time interval (TTI), a plurality of consecutive subframes may be referred to as a TTI, or one slot or one mini-slot may be referred to as a TTI. That is, at least one of the subframe and the TTI may be a subframe (1 ms) in existing LTE, may be a period shorter than the 1 ms (for example, 1 to 13 symbols), or may be a period longer than the 1 ms. Note that the unit representing the TTI may be referred to as a slot, a mini-slot, or the like instead of a subframe.

Here, the TTI refers to, for example, a minimum time unit of scheduling in wireless communication. For example, in the LTE system, the base station performs scheduling for allocating radio resources (a frequency bandwidth, transmission power, and the like which can be used in each terminal 20) to each terminal 20 in units of TTIs. The definition of the TTI is not limited to the definition described above.

The TTI may be a transmission time unit of a channel-coded data packet (transport block), a code block, a code word, or the like, or may be a processing unit of scheduling, link adaptation, or the like. Note that, when a TTI is given, a time interval (for example, the number of symbols) in which a transport block, a code block, a codeword, and the like are actually mapped may be shorter than the TTI.

Note that, when one slot or one mini-slot is referred to as a TTI, one or more TTIs (that is, one or more slots or one or more mini-slots) may be the minimum time unit of scheduling. The number of slots (the number of mini-slots) constituting the minimum time unit of the scheduling may be controlled.

The TTI having the time length of the 1 ms may be referred to as a normal TTI (TTI in LTE Rel. 8-12), a normal TTI, a long TTI, a normal subframe, a normal subframe, a long subframe, a slot, or the like. A TTI shorter than a normal TTI may be referred to as a shortened TTI, a short TTI, a partial TTI (partial or fractional TTI), a shortened subframe, a short subframe, a mini-slot, a sub-slot, a slot, or the like.

Note that a long TTI (for example, a normal TTI, a subframe, etc.) may be replaced with a TTI having a time length that exceeds the 1 ms, and a short TTI (for example, a shortened TTI, etc.) may be replaced with a TTI having a TTI length that is less than the TTI length of the long TTI and that is greater than or equal to the 1 ms.

A resource block (RB) is a resource allocation unit in the time domain and the frequency domain, and may include one or more consecutive subcarriers in the frequency domain. The number of subcarriers included in the RB may be the same regardless of the numerology, and may be, for example, 12. The number of subcarriers included in the RB may be determined based on a numerology.

In addition, the time domain of the RB may include one or more symbols and may be equal to one slot, one mini-slot, one subframe, or one 1TTI. Each of the 1TTI, one subframe, and the like may be configured with one or a plurality of resource blocks.

Note that one or a plurality of RBs may be referred to as a physical resource block (PRB: Physical RB), a subcarrier group (SCG: Sub-Carrier Group), a resource element group (REG: Resource Element Group), a PRB pair, an RB pair, or the like.

In addition, the resource block may be configured by one or a plurality of resource elements (REs). For example, the 1RE may be a radio resource region of one subcarrier and one symbol.

A Bandwidth Part (BWP) (which may also be referred to as a partial bandwidth, etc.) may refer to a subset of contiguous common resource blocks (RBs) for a numerology on a carrier. Here, the common RB may be specified by an index of the RB with respect to the common reference point of the carrier. The PRBs may be defined in a BWP and numbered within the BWP.

The BWP may include a BWP for UL (UL BWP) and a BWP for DL (DL BWP). One or more BWPs may be configured in one carrier for the UE.

At least one of the configured BWPs may be active, and the UE may not assume to transmit and receive certain signals/channels outside the active BWP. Note that the "cell", the "carrier", and the like in the present disclosure may be replaced with "BWP".

The above-described structures of the radio frame, the subframe, the slot, the mini-slot, the symbol, and the like are merely examples. For example, the number of subframes included in a radio frame, the number of slots per subframe or radio frame, the number of mini-slots included in a slot, the number of symbols and RBs included in a slot or mini-slot, the number of subcarriers included in an RB, the number of symbols in a TTI, the symbol length, the cyclic prefix (CP) length, and other configurations can be changed in various manners.

In the present disclosure, when articles are added by translation, for example, a, an, and the in English, the present disclosure may include that nouns following these articles are plural.

In the present disclosure, the term "A and B are different" may mean "A and B are different from each other". The term may also mean that "A and B are each different from C". The terms "separate", "coupled", etc. may be interpreted similarly to "different".

The aspects/embodiments described in the present disclosure may be used alone, may be used in combination, or may be used by switching in accordance with execution. In addition, the notification of the predetermined information (for example, the notification of "X") is not limited to being performed explicitly, and may be performed implicitly (for example, the notification of the predetermined information is not performed).

Although the present disclosure has been described in detail, it is apparent to those skilled in the art that the present disclosure is not limited to the embodiments described in the present disclosure. The present disclosure can be implemented as a modified and changed aspect without departing from the spirit and scope of the present disclosure defined by the description of the claims. Therefore, the description of the present disclosure is intended to be illustrative and not to limit the present disclosure in any manner.

DESCRIPTION OF THE REFERENCE NUMERALS

10 base station
110 transmission unit
120 reception unit
130 setting unit
140 control unit
20 terminal
210 transmission unit
220 reception unit
230 setting unit
240 control unit
1001 processor
1002 storage device
1003 auxiliary storage device
1004 communication device
1005 input device
1006 output device

The invention claimed is:

1. A base station comprising:

a transmitter that transmits, to a terminal, a first reference signal via a non-terrestrial communication device;

a receiver that receives, from the terminal, a second reference signal via the non-terrestrial communication device; and a processor that calculates, based on a measurement result of the first reference signal and a measurement result of the second reference signal, a receive-transmit time difference, wherein the processor transfers, to a Location Management Function (LMF), orbit information of a satellite and a common Timing Advance (TA) parameter, as assistance information for positioning using the receive-transmit time difference.

2. The base station according to claim 1, wherein the receive-transmit time difference is used, by the LMF, for positioning of the terminal based on multi-round trip time (RTT).

3. A communication system comprising:

a base station;

a terminal;

a non-terrestrial communication device; and a Location Management Function (LMF), wherein the base station includes a transmitter that transmits, to the terminal, a first reference signal via the non-terrestrial communication device, a receiver that receives, from the terminal, a second reference signal via the non-terrestrial communication device, and a processor that calculates, based on a measurement result of the first reference signal and a measurement result of the second reference signal, a receive-transmit time difference, wherein the processor transfers, to the LMF, orbit information of a satellite and a common Timing Advance (TA) parameter, as assistance information for positioning using the receive-transmit time difference, wherein the terminal includes a receiver that receives, from the base station, the first reference signal via the non-terrestrial communication device, and a transmitter that transmits, to the base station, the second reference signal via the non-terrestrial communication device, and wherein the LMF receives, from the base station, the orbit information of the satellite and the common TA parameter, as the assistance information for the positioning using the receive-transmit time difference.

4. A communication method executed by a base station, the method comprising:

transmitting, to a terminal, a first reference signal via a non-terrestrial communication device;

receiving, from the terminal, a second reference signal via the non-terrestrial communication device;

calculating, based on a measurement result of the first reference signal and a measurement result of the second reference signal, a receive-transmit time difference; and transferring, to a Location Management Function (LMF), orbit information of a satellite and a common Timing Advance (TA) parameter, as assistance information for positioning using the receive-transmit time difference.

* * * * *